(12) United States Patent
Park et al.

(10) Patent No.: US 11,611,643 B2
(45) Date of Patent: Mar. 21, 2023

(54) ELECTRONIC DEVICE FOR PERFORMING OPERATION ON BASIS OF TYPES OF IDENTIFIED COVERS, AND OPERATING METHOD THEREFOR

(71) Applicant: Samsung Electronics Co., Ltd., Suwon-si (KR)

(72) Inventors: Seoyeon Park, Suwon-si (KR); Jinyong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/309,187

(22) PCT Filed: Nov. 8, 2019

(86) PCT No.: PCT/KR2019/015127
§ 371 (c)(1),
(2) Date: May 4, 2021

(87) PCT Pub. No.: WO2020/196399
PCT Pub. Date: May 14, 2020

(65) Prior Publication Data
US 2022/0030099 A1 Jan. 27, 2022

(30) Foreign Application Priority Data
Nov. 8, 2018 (KR) .................. 10-2018-0136655

(51) Int. Cl.
*H04B 1/04* (2006.01)
*H04M 1/04* (2006.01)
(Continued)

(52) U.S. Cl.
CPC ............. *H04M 1/04* (2013.01); *H04W 12/06* (2013.01); *H02J 50/20* (2016.02); *H04M 2250/04* (2013.01)

(58) Field of Classification Search
CPC combination set(s) only.
See application file for complete search history.

(56) References Cited

U.S. PATENT DOCUMENTS

| 9,288,304 B2 | 3/2016 | Lin et al. |
| 2014/0274214 A1* | 9/2014 | Kim .................. G06F 3/048 |
| | | 455/566 |

(Continued)

FOREIGN PATENT DOCUMENTS

| JP | 3204463 U | 6/2016 |
| KR | 20-0462038 Y1 | 8/2012 |

(Continued)

OTHER PUBLICATIONS

International Search Report and Written Opinion of the International Searching Authority in connection with International Application No. PCT/KR2019/015127 dated Feb. 26, 2020, 10 pages.

(Continued)

*Primary Examiner* — Thanh C Le

(57) ABSTRACT

Various embodiments of the present invention relate to an electronic device having covers which may be coupled and an operating method thereof, the electronic device may include a housing; a first cover coupled with at least part of the housing, and comprising at least one first identification terminal; a second cover coupled with at least part of the first cover, and comprising at least one second identification terminal which is electrically connectable with the first identification terminal; and a processor. The processor may be configured to obtain at least one of first information related to the first cover or second information related to the second cover, identify at least one of a type of the first cover or a type of the second cover based on at least one of the first information or the second information, and perform a designated operation based on at least one of the type of the first (Continued)

cover or the type of the second cover. Other various embodiments are possible.

20 Claims, 23 Drawing Sheets

(51) Int. Cl.
*H04W 12/06* (2021.01)
*H02J 50/20* (2016.01)

(56) References Cited

U.S. PATENT DOCUMENTS

| | | |
|---|---|---|
| 2016/0028873 A1 | 1/2016 | Du et al. |
| 2016/0154512 A1 | 6/2016 | Won |
| 2017/0019511 A1 | 1/2017 | Yang et al. |
| 2017/0026069 A1 | 1/2017 | Kim et al. |
| 2017/0338846 A1 | 11/2017 | Lee et al. |
| 2018/0219853 A1* | 8/2018 | Ueno ............... H04L 63/083 |
| 2018/0331725 A1 | 11/2018 | Hong |
| 2021/0281290 A1* | 9/2021 | Hwang ............. H04M 1/724 |
| 2021/0409533 A1* | 12/2021 | Kim ................. H04B 1/3888 |
| 2022/0116494 A1* | 4/2022 | Chang ............... H04M 1/04 |
| 2022/0125172 A1* | 4/2022 | Lee ..................... G09F 9/30 |

FOREIGN PATENT DOCUMENTS

| | | |
|---|---|---|
| KR | 10-2014-0092722 A | 7/2014 |
| KR | 10-2015-0020997 A | 2/2015 |
| KR | 10-2015-0091610 A | 8/2015 |
| KR | 10-2017-0087754 A | 7/2017 |

OTHER PUBLICATIONS

Notice of Preliminary Rejection dated Jan. 13, 2023 in connection with Korean Patent Application No. 10-2018-0136655, 12 pages.

* cited by examiner

ELECTRONIC DEVICE FOR PERFORMING OPERATION ON BASIS OF TYPES OF IDENTIFIED COVERS, AND OPERATING METHOD THEREFOR

CROSS-REFERENCE TO RELATED APPLICATIONS

This application is a 371 of International Application No. PCT/KR2019/015127, filed Nov. 8, 2019, which claims priority to Korean Patent Application No. 10-2018-0136655, filed Nov. 8, 2018, the disclosures of which are herein incorporated by reference in their entirety.

BACKGROUND

1. Field

Various embodiments of the present invention relate to an electronic device for performing an operation based on types of identified covers and an operating method thereof.

2. Description of Related Art

As electronic communication technology develops, electronic devices having various functions are emerging. Meanwhile, interest in various accessory devices for electronic devices is increasing in recent. For example, a cover (e.g., a protective cover) which is fastened to an electronic device to protect the electronic device from an external shock draws more attention.

Recent covers may provide various function in association with an electronic device, beyond a simple protection role. For example, the cover may include a light emitting device for providing a notification and/or a touch panel for receiving a touch input. Alternatively, in a view-type cover including a window in part to expose part of a display of the electronic device, the electronic device may provide information through a partial area of the display exposed through the window while the view-type cover is closed.

The covers may generally include a first portion coupled to at least part of a rear surface and a side surface of a housing of the electronic device, and a second portion covering a front surface of the electronic device.

However, as the first portion and the second portion of the cover are integrally formed, there is inconvenience in replacing the entire cover even if only a part (e.g., the first portion or the second portion) is damaged. For example, if the first portion is damaged, the cover may not replace only the damaged first portion. In addition, to selectively use covers of various types, a user experiences inconvenience in purchasing a plurality of covers.

According to various embodiments of the present invention, a cover for replacing at least one of a first portion (a first cover) or a second portion (a second cover) may be provided.

According to various embodiments of the present invention, a type of a first cover and/or a second cover currently fastened may be recognized, and a designated operation may be performed based on a recognition result.

SUMMARY

According to an embodiment of the present invention, an electronic device may include a housing; a first cover coupled with at least part of the housing, and including at least one first identification terminal; a second cover coupled with at least part of the first cover, and including at least one second identification terminal which is electrically connectable with the first identification terminal; and a processor. The processor may be configured to obtain at least one of first information related to the first cover or second information related to the second cover, identify at least one of a type of the first cover or a type of the second cover based on at least one of the first information or the second information, and perform a designated operation based on at least one of the type of the first cover or the type of the second cover.

According to an embodiment of the present invention, an operating method of an electronic device which includes a first cover coupled with at least part of a housing and including a first identification terminal, and a second cover coupled with at least part of the first cover and including a second identification terminal which is electrically connectable with the first identification terminal, may include obtaining at least one of first information related to the first cover or second information related to the second cover; identifying at least one of a type of the first cover or a type of the second cover based on at least one of the first information or the second information; and performing a designated operation based on at least one of the type of the first cover or the type of the second cover.

According to an embodiment of the present invention, an electronic device may include a housing, at least one antenna configured to receive power, and transmit and receive a signal from a first external electronic device; an interface module including an identification terminal for identifying a type of a second external electronic device coupled to the electronic device; and a processor. The processor may be configured to perform an authentication procedure with the first external electronic device when detecting coupling with the first external electronic device, after finishing the authentication, when detecting coupling of the second external electronic device identify the second external electronic device through the identification terminal and transmit identification information related to the second external electronic device to the first external electronic device, and receive, from the first external electronic device, data for conducting a designated operation based on a type of the second external electronic device through the at least one antenna.

According to various embodiments of the present invention, a first cover or a second cover may be attached and detached, and thus only the first cover or the second cover may be purchased. A user may use protective covers of various types at a relatively low cost compared to a conventional protective cover in which the first cover and the second cover are integrally formed.

According to various embodiments of the present invention, the user may separate or replace only a cover (a first cover or a second cover) which is damaged, thus reducing a replacement cost due to the cover damage.

Various embodiments of the present invention may perform a designated operation (or function) according to a type of a first cover or a second cover which is currently coupled. For example, an electronic device according to various embodiments of the present invention may provide a user with a use environment (e.g., user experience, UX) adequate for at least one type of the first cover or the second cover coupled.

Besides, effects attained or predicted with various embodiments of the present invention are disclosed directly or implicitly in detailed descriptions of embodiments of the present invention. For example, various effects predicted according to various embodiments of the present invention shall be disclosed in the detailed descriptions to be explained.

DETAILED DESCRIPTION

Figure 1:
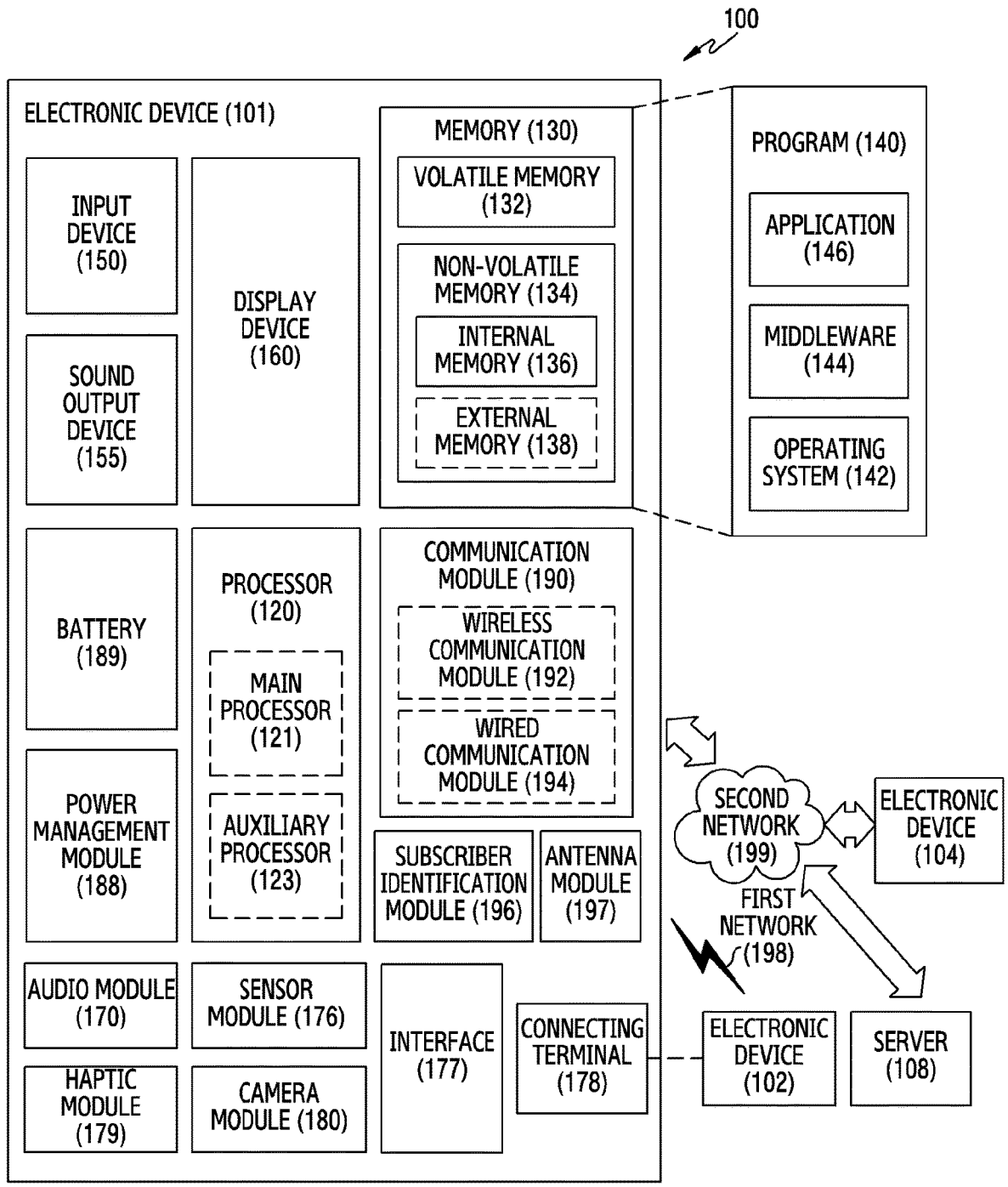
FIG. 1 is a block diagram of an electronic device in a network environment, for performing an operation based on types of identified covers, according to an embodiment.

Hereinafter, various embodiments of the present invention will be described with reference to the accompanying drawings. Although the present document discloses specific embodiments in the drawings and their related details, it is not intended to limit various embodiments of the present invention to specific forms. For example, it is apparent to those skilled in the art to which the present invention pertains that the embodiments of the present invention may be changed variously.

FIG. 1 is a block diagram illustrating an electronic device 101 in a network environment 100, for performing an operation based on types of identified covers, according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
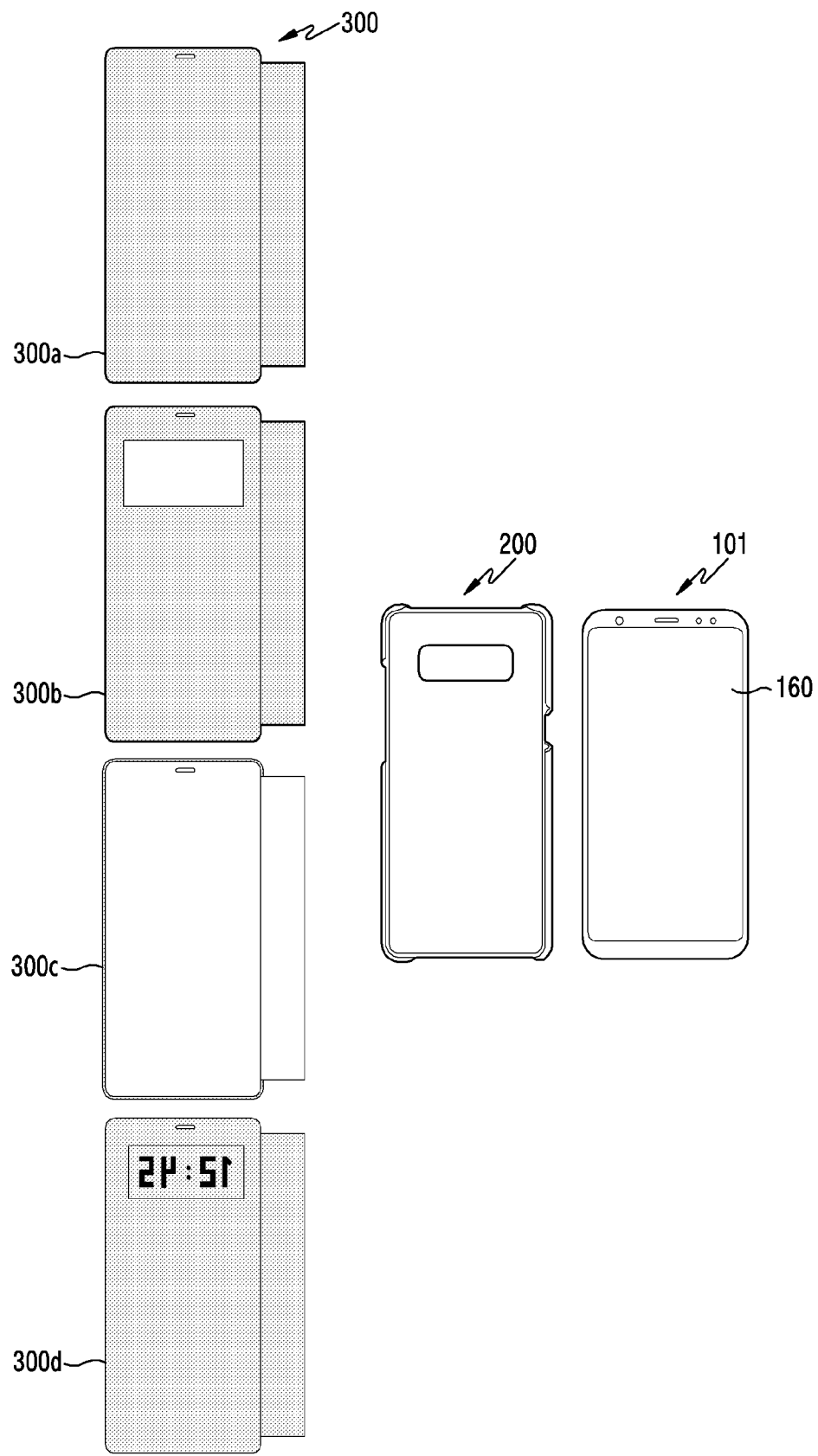
FIG. 2 is a diagram illustrating an electronic device, a first cover, and a second cover according to an embodiment of the present invention.
Figure 3A:
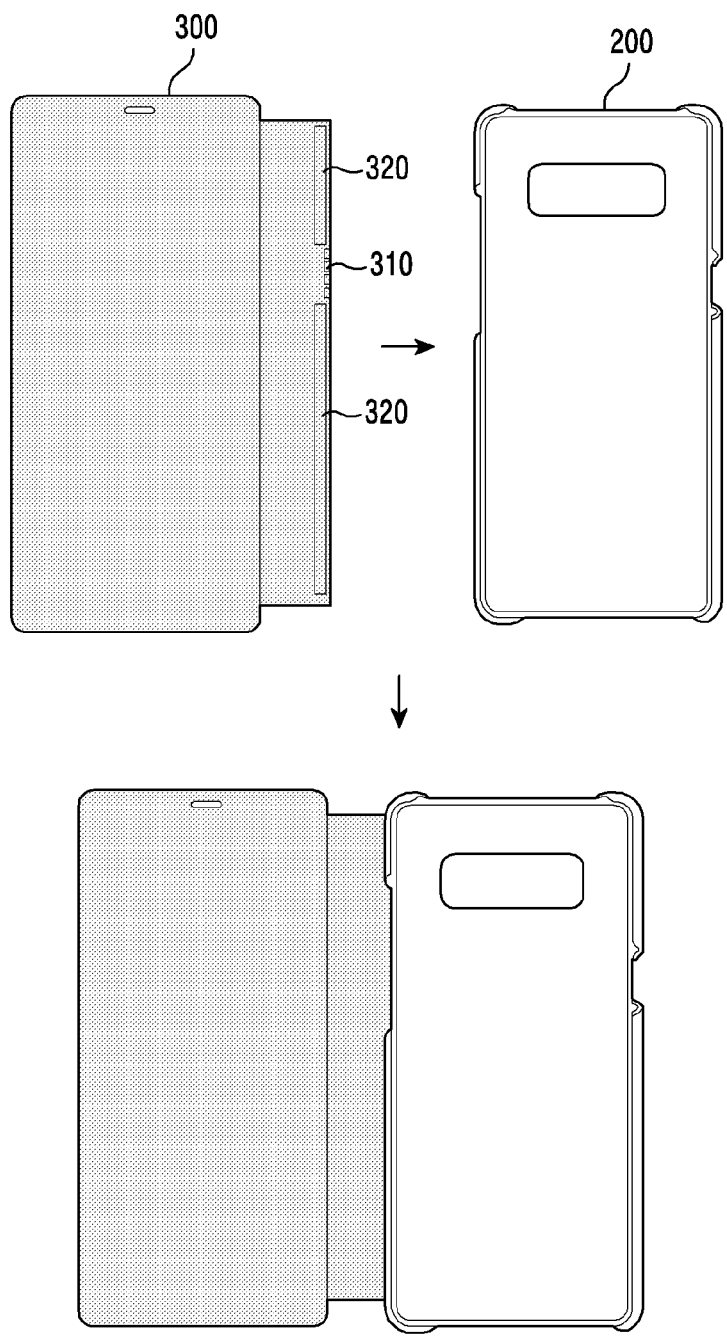
FIG. 3A is a view illustrating that a first cover and a second cover are coupled according to an embodiment of the present invention.
Figure 3B:
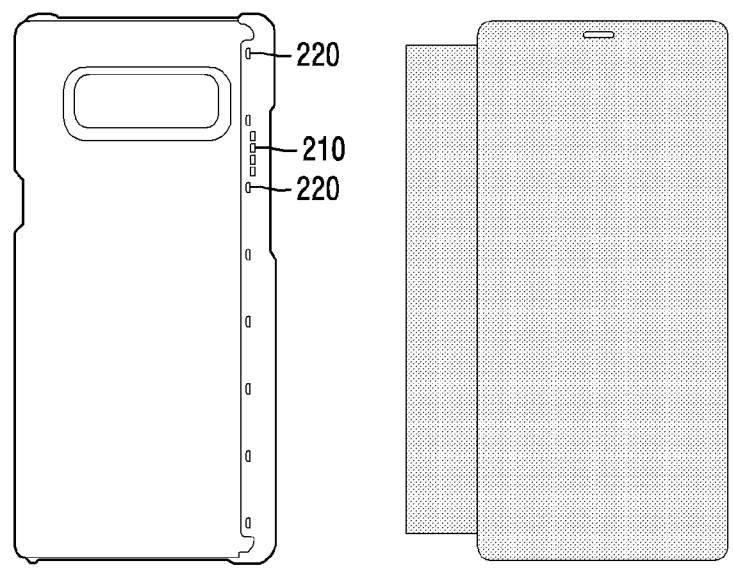
FIG. 3B is a view illustrating that the first cover and the second cover are coupled according to an embodiment of the present invention.
Figure 3B:
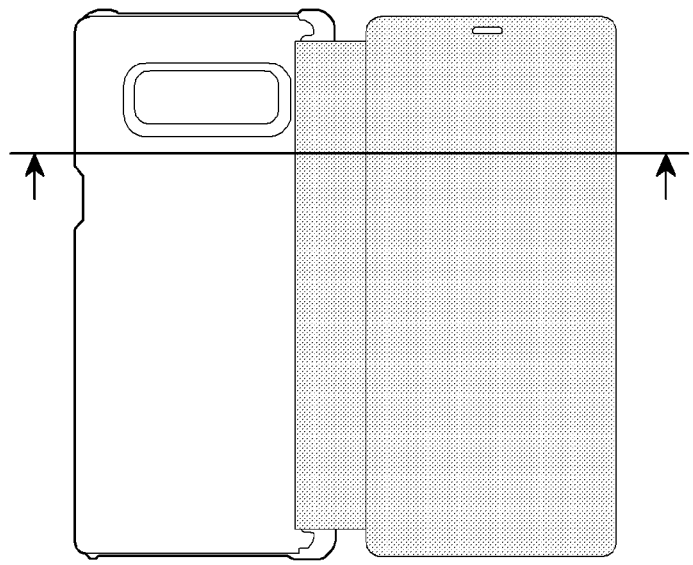
Figure 3C:
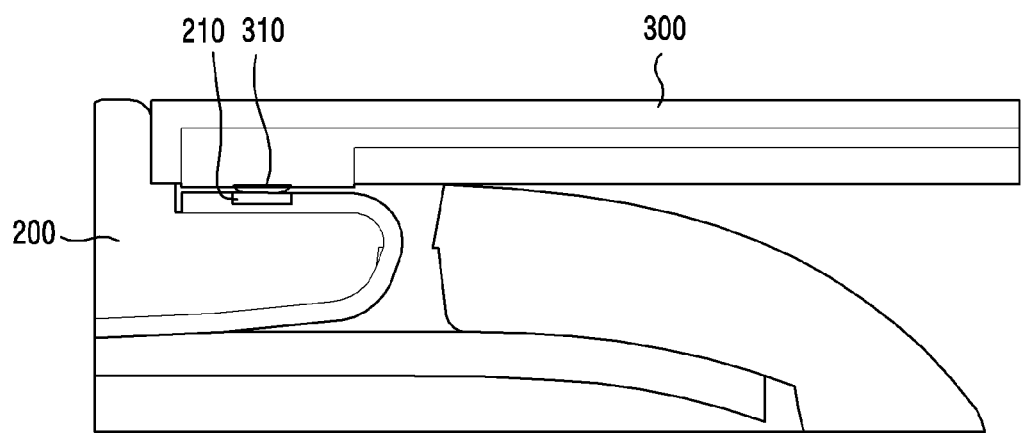
FIG. 3C is a cross-sectional view of the first cover and the second cover according to an embodiment of the present invention.
Figure 4:
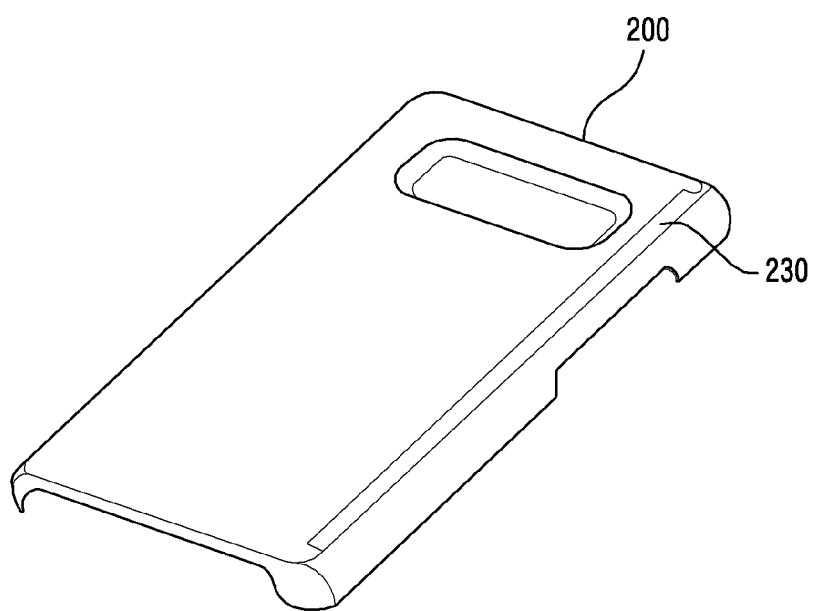
FIG. 4 is a view illustrating a first cover according to an embodiment of the present invention.

FIG. 2 is a diagram illustrating an electronic device, a first cover, and a second cover according to an embodiment of the present invention, FIG. 3A is a view illustrating that a first cover and a second cover are coupled according to an embodiment of the present invention, FIG. 3B is a view illustrating that the first cover and the second cover are coupled according to an embodiment of the present invention, FIG. 3C is a cross-sectional view of the first cover and the second cover according to an embodiment of the present invention, and FIG. 4 is a view illustrating a first cover according to an embodiment of the present invention.

Referring to FIG. 2 through FIG. 4, an embodiment of the present invention may include an electronic device 101, a first cover 200 and a second cover 300.

The electronic device 101 according to an embodiment of the present invention may be an electronic device of various types such as a smart phone or a tablet personal computer (PC) to which an accessory device (e.g., a protective cover) may be coupled.

The first cover 200 according to an embodiment of the present invention may be coupled with at least part (hereinafter, a first portion) (e.g., a rear surface and a side surface) of a housing of the electronic device 101. The first cover 200 may protect the first portion of the electronic device 101.

The second cover 300 according to an embodiment of the present invention may be coupled with at least part of the first cover 200, and may be opened or closed. For example, the second cover 300 may protect a second portion (e.g., a front surface where a display device 160 is exposed) of the electronic device 101 if it is closed, and expose the second portion to outside if it is opened.

The second cover 300 according to an embodiment of the present invention may include a normal cover 300a, a view cover 300b, a transparent cover 300c or a light emitting diode (LED) cover 300d. This is only an example, and does not limit the embodiment of the present invention, and the second cover 300 may have various forms. The user may selectively couple and use one of the plurality of the second covers 300a, 300b, 300c, and 300d with the first cover 200, or may couple and use only the first cover 200 with the electronic device 101.

The first cover 200 according to an embodiment of the present invention may be coupled with the second cover 300 to be physically detached using magnetic force, and may be electrically connected through a plurality of terminals. For example, as shown in FIG. 3A and FIG. 3B, the first cover 200 may include a plurality of magnetic bodies 220, and the second cover 300 may include a metal member 320 disposed at a position corresponding to the magnetic body 220. Also, the first cover 200 may include a plurality of first terminals 210, and the second cover 300 may include a plurality of second terminals 310 electrically connected with the plurality of the first terminals 210. The plurality of the first terminals 210 and the plurality of the second terminals 310 may include a power terminal for power supply, a ground terminal, a communication terminal for data communication and an identification terminal. The plurality of the first terminals 210 and the plurality of the second terminals 310 may be contacted and electrically connected if the first cover 200 and the second cover 300 are coupled. The plurality of the first terminals 210 or the plurality of the second terminals 310 may form a pogo pin (e.g., a pin of a protrusion type having an elastic force), and the other terminals may form a metal plate of a specific shape (e.g., square, circle, etc.). For example, as shown in FIG. 3C, if the first cover 200 and the second cover 300 are coupled, the plurality of the first terminals 210 and the plurality of the second terminals 310 may be contacted, and the contact may be maintained by attraction of the magnetic body 220 and the metal member 320. This is merely exemplary, and the first cover 200 and the second cover 300 may be physically and/or electrically connected in various manners. Detailed descriptions thereof shall be described with reference to FIG. 11A through FIG. 12C.

According to an embodiment of the present invention, the first cover 200 and the second cover 300 are detachable, and the second cover 300 may be replaced and used according to a user's preference. Alternatively, if the first cover 200 or the second cover 300 is damaged, only the damaged cover may be replaced.

According to some embodiment, the second cover 300 is not coupled, and only the first cover 200 may be coupled and used in the electronic device 101. For example, the first cover 200 may include, as shown in FIG. 4, an auxiliary cover member 230 which is coupled to some region so as not to expose the some region (e.g., a portion where the first terminal 210 and the magnetic body 220 are positioned) of the first cover 200 to outside. The auxiliary cover member 230 includes a metal member therein, and may be coupled to the first cover 200 by the attraction between the metal member and the magnetic body 220 of the first cover 200.

The electronic device 101 according to an embodiment of the present invention may acquire at least one of first information related to the first cover 200 or second information related to the second cover 300, identify at least one of a type of the first cover 200 or a type of the second cover 300 based on at least one of the first information or the second information, and perform a designated operation based on at least one of the type of the first cover 200 or the type of the second cover 300.

Figure 5:
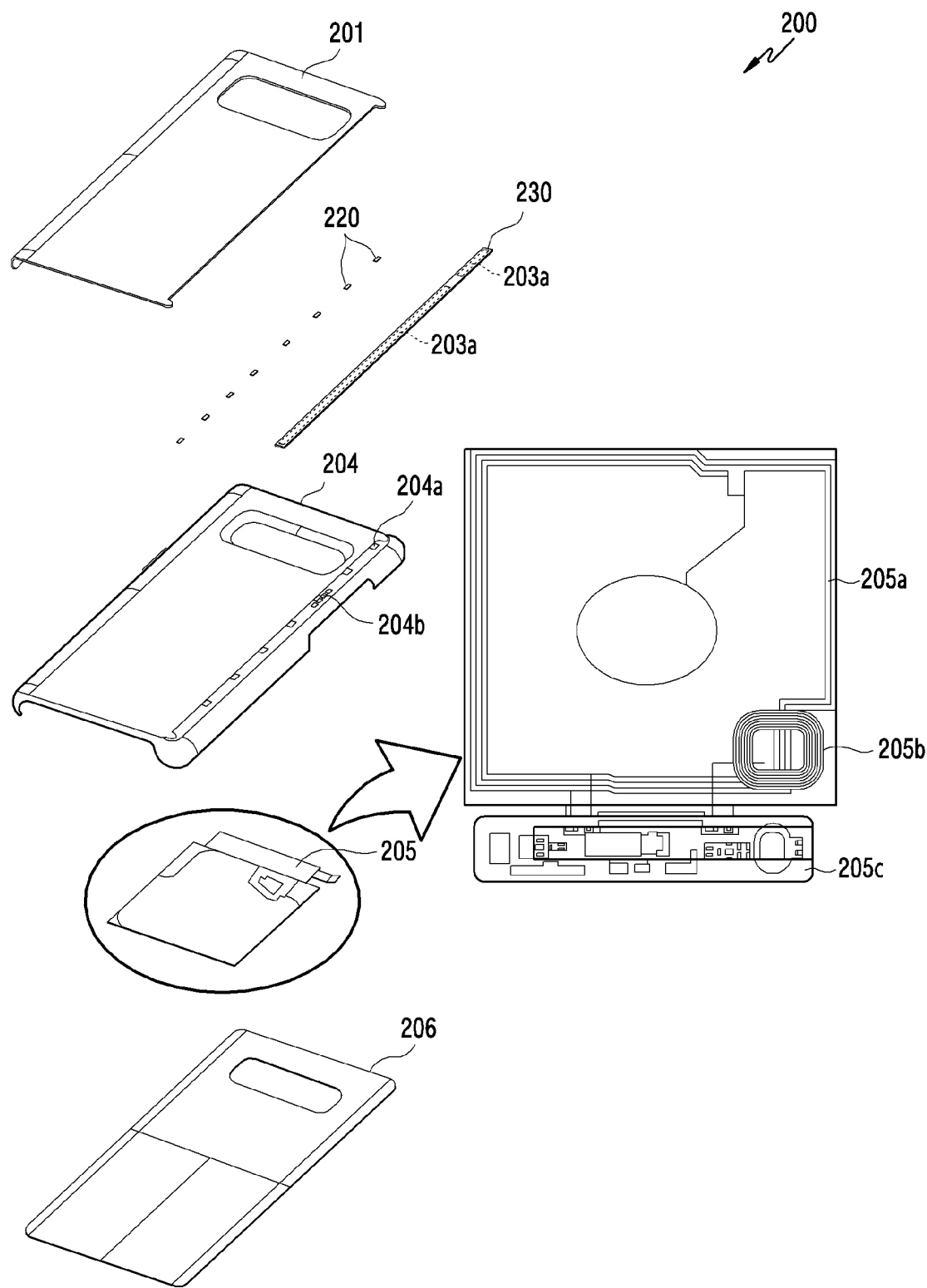
FIG. 5 is an exploded perspective view of a first cover according to an embodiment of the present invention.

FIG. 5 is an exploded perspective view of a first cover according to an embodiment of the present invention.

Referring to FIG. 5, a first cover 200 may include an outer shell 201, a magnetic body 220, an auxiliary cover member 230, a housing 204, a control module 205 and an inner shell 206.

The outer shell 201 may be attached to an outer surface of the housing 204. The outer shell 201 may be formed with a fabric or a leather.

The magnetic body 220 may be inserted into a groove 204a of the housing 204. Part of the magnetic body 220 may be positioned to correspond to a detecting sensor (e.g., a Hall IC) disposed in the electronic device 101 to detect whether the first cover 200 is mounted. The auxiliary cover member 230 may be coupled to part of the outer surface of the housing 204 not to expose the magnetic body 220 and the first terminals 210 to outside if the second cover 300 is not used. The auxiliary cover member 230 is formed with the same material as the outer shell 201, and may include a metal member 203a therein.

The housing 204 may include the groove 204a into which the magnetic body 202 is inserted and a hole 204b where the first terminals 210 are disposed. The housing 204 may be formed with an injection material.

The control module 205 may include at least one antenna. For example, the control module 205 may include a first antenna 205a for receiving first power (e.g., about 100 mW) from the electronic device 101, and a second antenna 205b electrically separated from the first antenna 205a and receiving second power (e.g., about 1 mW) and an authentication request signal. The first antenna 205a and the second antenna 205b may be formed in a conductive pattern of a loop type. Sizes of the loops of the first antenna 205a and the second antenna 205b may be different from each other. According to an embodiment, the size of the first antenna 205a may be greater than the size of the second antenna 205b.

According to an embodiment, the first antenna 205a and the second antenna 205b may be set with separate resonant frequencies to allow normal operations of a short-range communication antenna of the electronic device 101 and the first antenna 205a and the second antenna 205b while the electronic device 101 and the first cover 200 are coupled and the short-range communication antenna of the electronic device 101 and the first antenna 205a and the second antenna 205b of the first cover 200 are overlapped. For example, the resonant frequency of the second antenna 205b may be set to match a resonant frequency of the short-range communication antenna of the electronic device 101, and the resonant frequency of the first antenna 205a may be set to a completely different frequency band which does not overlap the resonant frequency of the short-range communication antenna of the electronic device 101.

According to an embodiment, the control module 205 may include a control circuit 205c including an authentication module which is electrically connected with the second antenna 205b and performs an authentication operation by receiving an authentication request signal through the second antenna 205b, a power module which is electrically connected with the first antenna 205a and generates power by rectifying the first power received through the first antenna 205a, and a communication module for communicating with the second cover 300.

The inner shell 206 may be attached to the inner surface of the housing 204. The inner shell 206 may be formed with a fabric or a leather.

Figure 6:
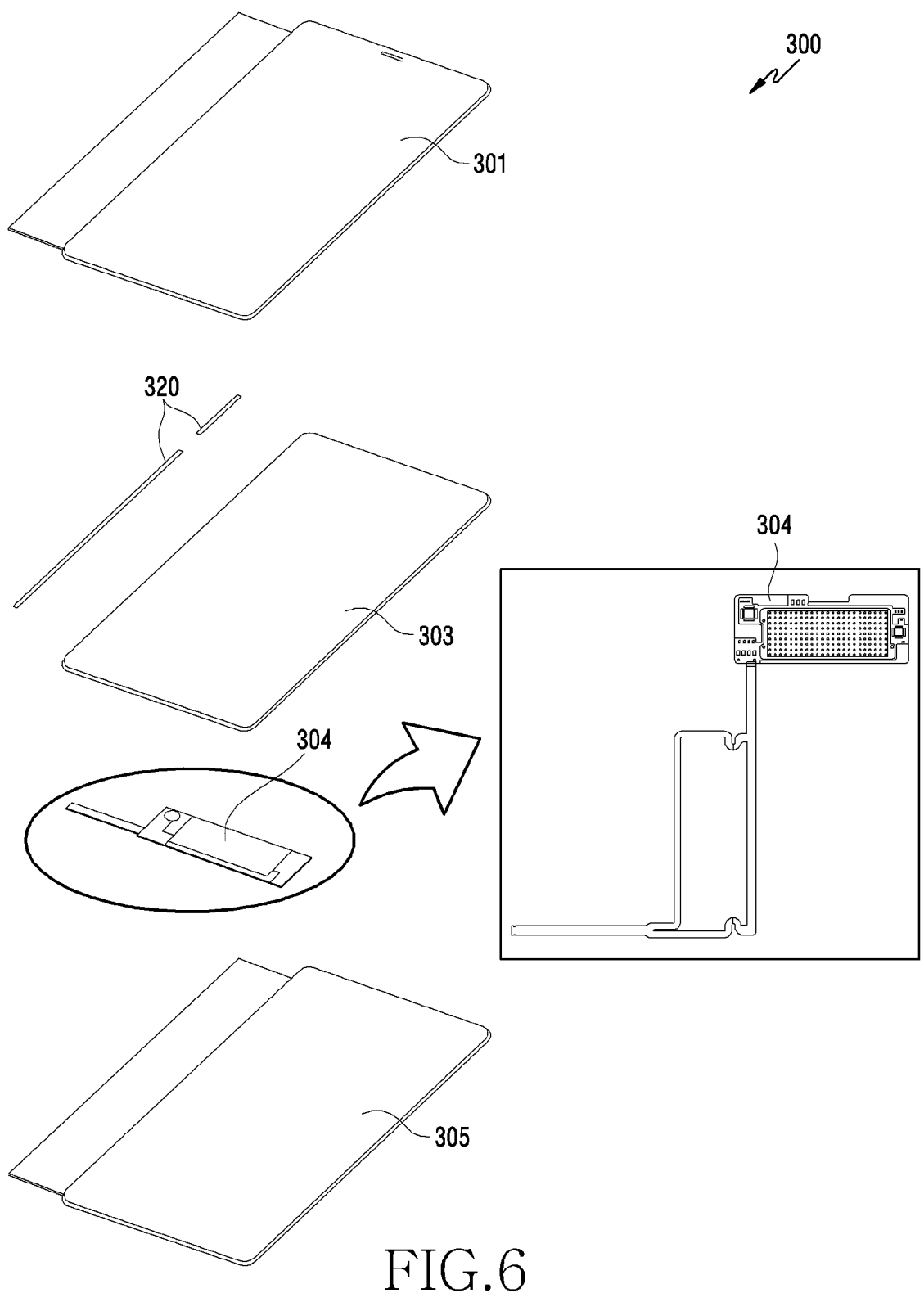
FIG. 6 is an exploded perspective view of a second cover according to an embodiment of the present invention.

FIG. 6 is an exploded perspective view of a second cover according to an embodiment of the present invention.

Referring to FIG. 6, the second cover 300 may include an outer shell 301, a metal member 320, a housing 303, a light emitting module 304 and an inner shell 305.

The outer shell 301 may be attached to an outer surface of the housing 303, and the inner shell 305 may be attached to an inner surface of the housing 303. The outer shell 301 and the inner shell 305 may be formed with a fabric or a leather.

The metal member 320 may be inserted between the outer shell 301 and the inner shell 305, and may be positioned to correspond to the magnetic body 220 positioned on the first cover 200.

The housing 303 may be a plate formed with an injection material. According to an embodiment, the housing 303 may include a hole (e.g., a view window).

The light emitting module 304 may be driven by the power transmitted through the first cover 200, and may display various information (e.g., text, alert notification, or time). The various information may be data received at the first cover 200 from the electronic device 101 through the second antenna 205b and transmitted to the second cover 300. According to an embodiment, the light emitting module 304 may include a plurality of light emitting elements. The light emitting elements may be arranged in various forms (e.g., a matrix form).

According to an embodiment, the light emitting module 304 may be replaced with a display module, or omitted. According to an embodiment, the second cover 300 may further include a touch panel.

Figure 7:
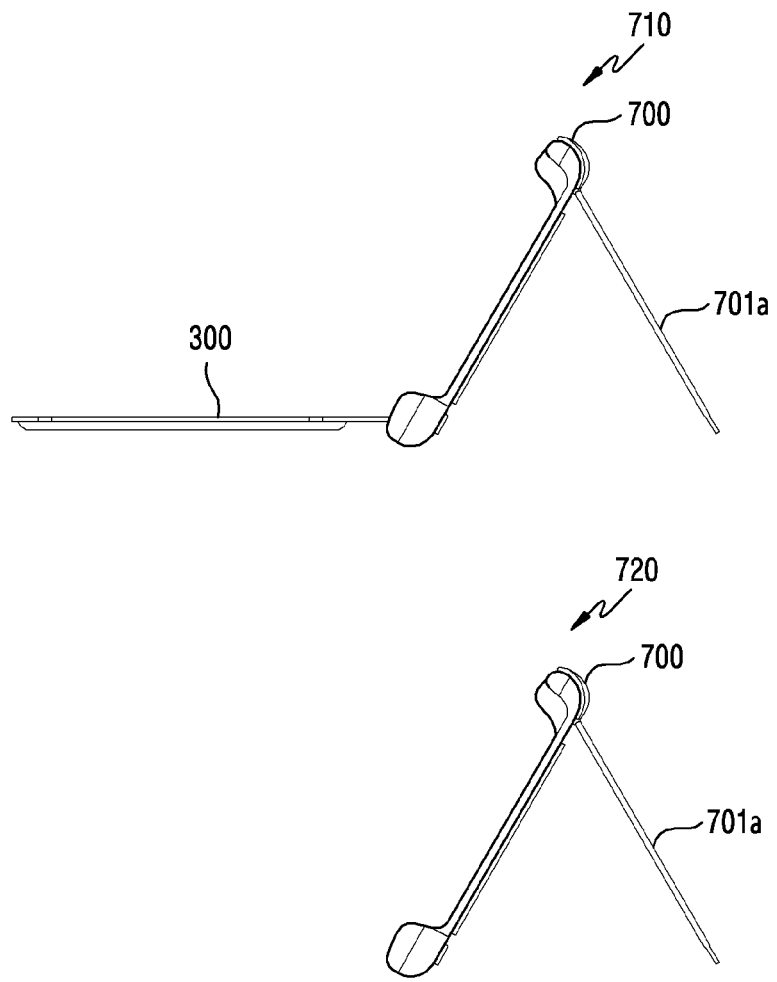
FIG. 7 is a view illustrating a second cover according to an embodiment of the present invention.
Figure 8:
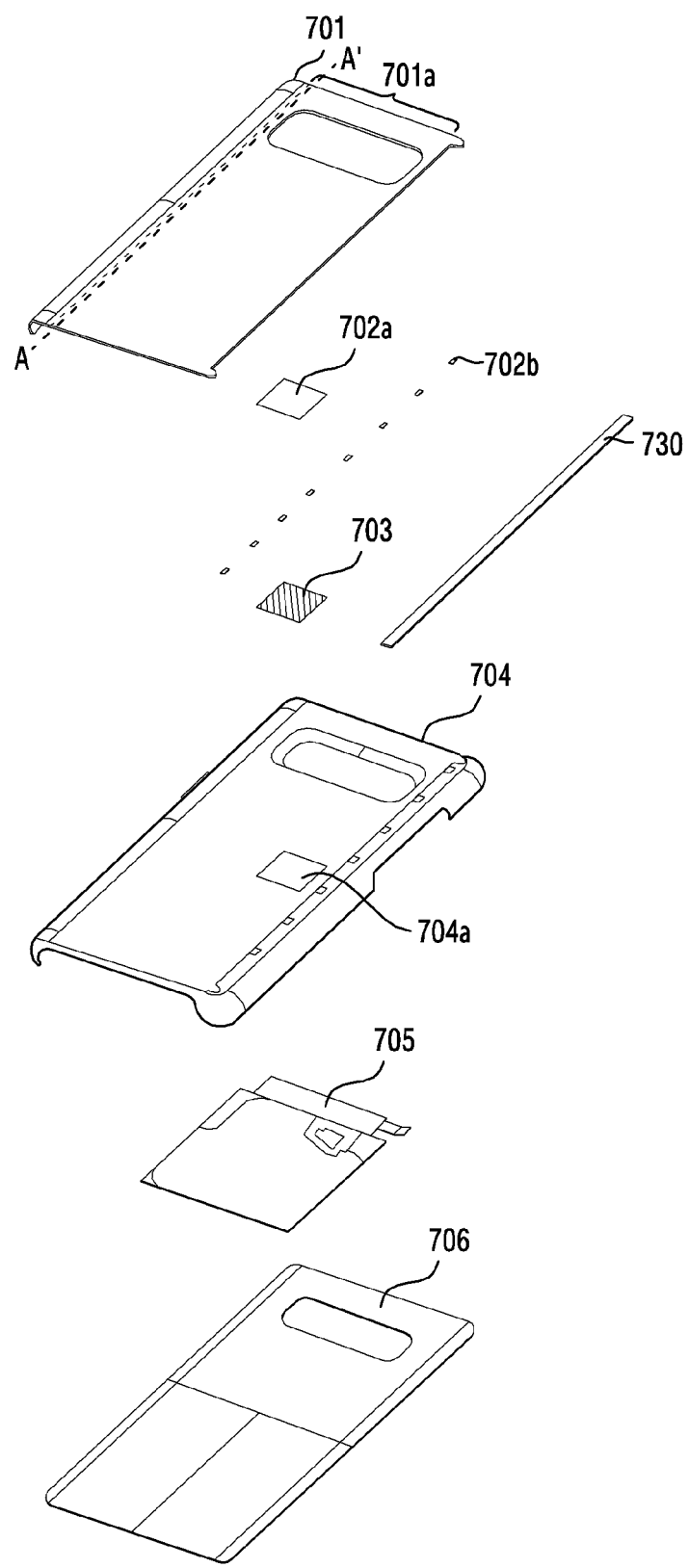
FIG. 8 is an exploded perspective view of a second cover according to an embodiment of the present invention.

FIG. 7 is a view illustrating a second cover according to an embodiment of the present invention, and FIG. 8 is an exploded perspective view of a second cover according to an embodiment of the present invention.

Referring to FIG. 7 and FIG. 8, a first cover 700 may provide a standing function of an electronic device (e.g., the electronic device 101). For example, as shown in the drawings of the reference numerals 710 and 720 of FIG. 7, a part 701a of an outer shell 701 may be spaced apart from an outer surface and the first cover 700 may serve as a support.

The first cover 700 according to an embodiment of the present invention may include the outer shell 701, a first magnetic body 702a, a second magnetic body 702b, a metal member 703, an auxiliary cover member 730, a housing 704, a control module 705 and an inner shell 706.

The outer shell 701 may be attached to the outer surface of the housing 704. The part 701a of the outer shell 701 may be spaced apart (or opened) from the housing 704. For example, the part 701a of the outer shell 701 may be spaced based on an axis A-A'. The part 701a of the outer shell 701 may have a strength for supporting the electronic device.

The first magnetic body 702a may be attached to one inner side of the outer shell 701, and the metal member 703 may be attached to one outer side 704a of the housing 704. The part 701a of the outer shell 701 may be coupled (attached) to the housing 704 by attraction between the first magnetic body 702a and the metal member 703, and may be spaced from the housing 704 by an external force greater than the attraction. The first magnetic body 702a and the metal member 703 may be mounted not to be exposed to the outside. According to an embodiment, the first magnetic body 702a may be positioned in the housing 704, and the metal member 703 may be positioned in the partial region 701a of the outer shell 701.

The second magnetic body 702b, the auxiliary cover member 730, the housing 704, the control module 705 and the inner shell 706 are similar to the magnetic body 202, the auxiliary cover member 230, the housing 204, the control module 205 and the inner shell 206 of FIG. 5, and thus their detailed descriptions shall be omitted.

Figure 9A:
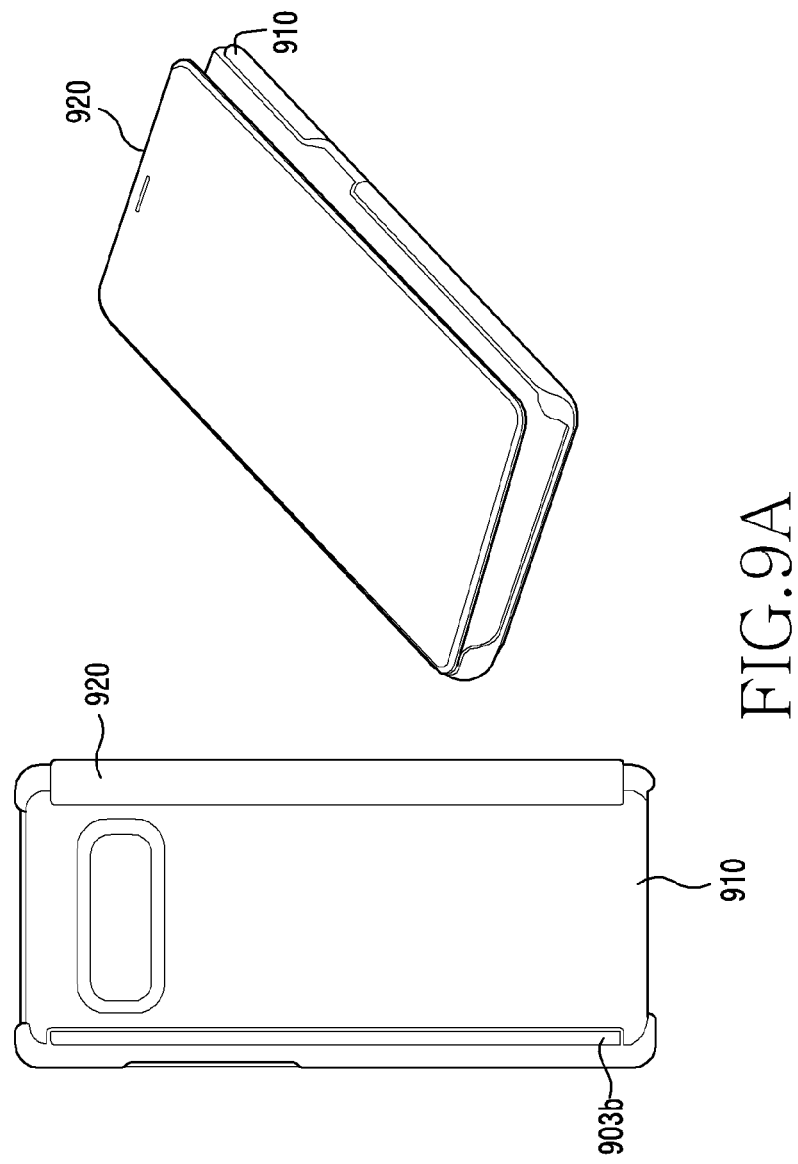
FIG. 9A is a view illustrating a first cover and a second cover according to an embodiment of the present invention.
Figure 9B:
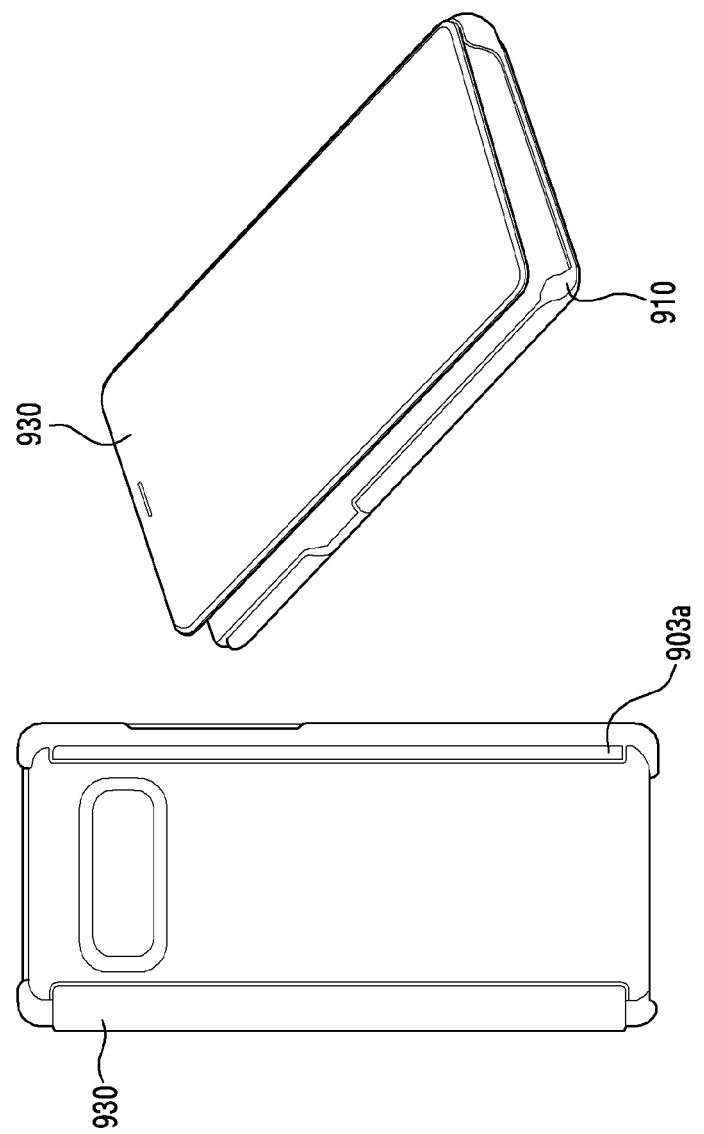
FIG. 9B is a view illustrating the first cover and the second cover according to an embodiment of the present invention.
Figure 10:
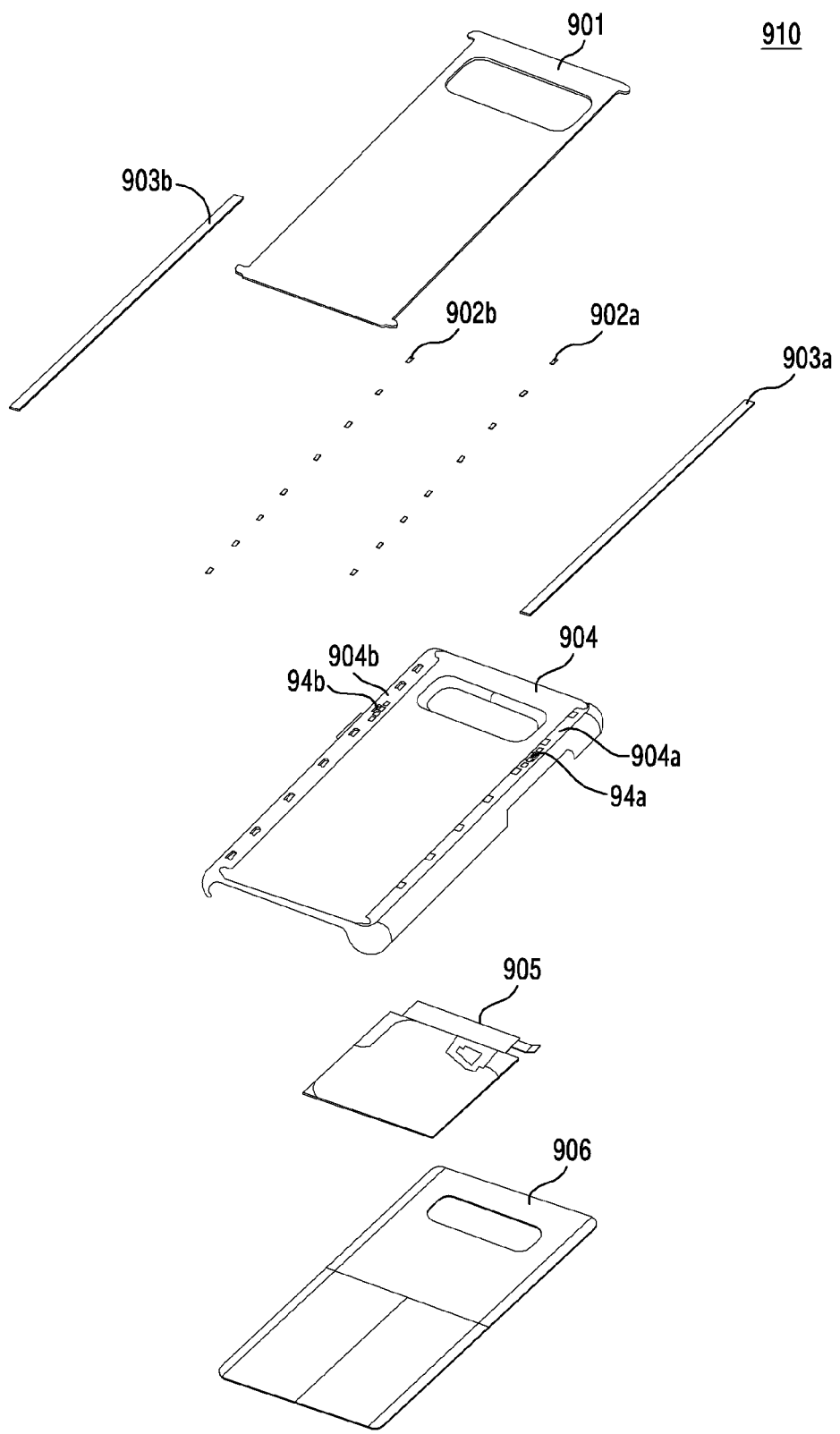
FIG. 10 is an exploded perspective view of a first cover according to an embodiment of the present invention.

FIG. 9A and FIG. 9B are views illustrating a first cover and a second cover according to an embodiment of the present invention, and FIG. 10 is an exploded perspective view of a first cover according to an embodiment of the present invention.

Referring to FIG. 9A and FIG. 9B, a first cover 910 according to an embodiment of the present invention may be coupled with a right-handed cover 920 which is opened in a first direction (left) or a left-handed cover 930 which is opened in a second direction (right).

Referring to FIG. 10, a first cover 910 according to an embodiment of the present invention may include an outer shell 901, a first magnetic body 902a, a second magnetic body 902b, a first auxiliary cover member 903a, a second auxiliary cover member 903b, a housing 904, a control module 905 and an inner shell 906.

The outer shell 901 may be attached to an outer surface of the housing 904. The outer shell 901 may not cover some region (e.g., some right side 904a and some left side 904b) of the outer surface to which the right-handed cover 920 (or the first auxiliary cover member 903a) and the left-handed cover 930 (or the second auxiliary cover member 903b) are attached.

The first magnetic bodies 902a may be inserted to the right side surface (if viewing the rear surface of the housing as shown in FIG. 10) of the housing 904 to provide magnetism for the coupling of the right-handed cover 920 (or the first auxiliary cover member 903a), or may be inserted to the left side surface of the housing 904 to provide magnetism for the coupling of the left-handed cover 930 (or the second auxiliary cover member 903b).

If the right-handed cover 920 and the left-handed cover 930 are not used, or the left-handed cover 930 is used, the first auxiliary cover member 903a may be attached to some right side 904a of the housing 904 not to expose the first magnetic body 902a and first terminals 94a disposed on the right side to the outside. Similarly, if the right-handed cover 920 and the left-handed cover 930 are not used, or the left-handed cover 930 is used, the second auxiliary cover member 903b may be attached to some left side 904b of the housing 904 not to expose the second magnetic body 902b and first terminals 94b disposed on the left side to the outside.

The first terminals 94a disposed on the right side and the first terminals 94b disposed on the left side may be electrically connected, to connect with the control module 905. According to an embodiment, the first terminals 94a disposed on the right side and the first terminals 94b disposed on the left side may be electrically connected with the control module 905 respectively.

The control module 905 and the inner shell 906 are similar to the control module 205 and the inner shell 206 of FIG. 5 respectively, and their detailed descriptions shall be omitted.

Figure 11A:
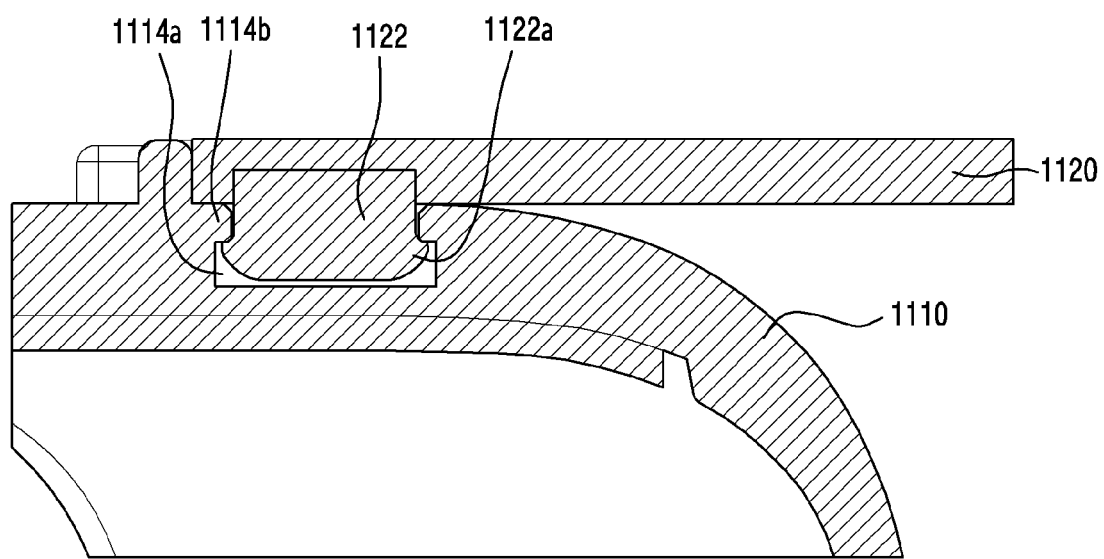
FIG. 11A is a cross-sectional view illustrating a coupling structure of a first cover and a second cover according to an embodiment of the present invention.
Figure 11B:
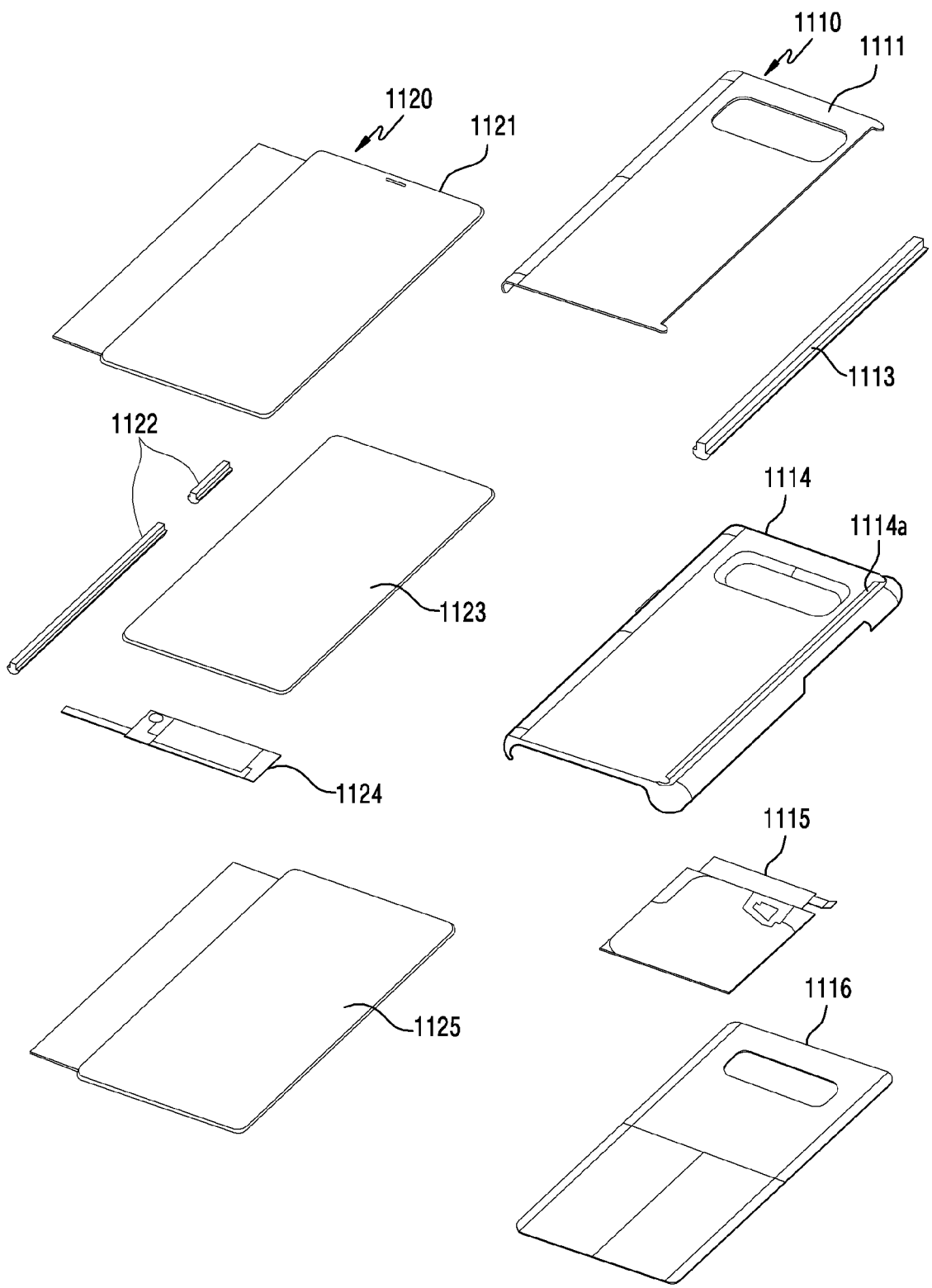
FIG. 11B is an exploded perspective view of the first cover and the second cover according to an embodiment of the present invention.

FIG. 11A is a cross-sectional view illustrating a coupling structure of a first cover and a second cover according to an embodiment of the present invention, and FIG. 11B is an exploded perspective view of the first cover and the second cover according to an embodiment of the present invention.

Referring to FIG. 11A and FIG. 11B, a first cover 1110 and a second cover 1120 according to an embodiment of the present invention may be coupled in a hook manner.

The first cover 1110 according to an embodiment of the present invention may include an outer shell 1111, an auxiliary cover member 1113, a housing 1114, a control module 1115 and an inner shell 1116. The second cover 1120 according to an embodiment of the present invention may include an outer shell 1121, a coupling member 1122, a housing 1123, a light emitting module 1124 and an inner shell 1125.

According to an embodiment, the first cover 1110 may include a first groove 1114a formed in a direction substantially perpendicular to the surface. The first groove 1114a may include a first hooking jaw 1114b.

According to an embodiment, the coupling member 1122 of the second cover 1120 protrudes in a direction substantially perpendicular to the surface at one end of the second cover 1120, and may have a first protrusion 1122a corresponding to the first hooking jaw 1114b. The first cover 1110 and the second cover 1120 may be coupled by the first hooking jaw 1114b and the first protrusion 1122a.

According to some embodiment, without the first hooking jaw 1114b and the first protrusion 1122a, the coupling member 1122 of the second cover 1120 may be coupled to the first groove 1114a of the first cover 1110 in a press fit manner.

Meanwhile, the first cover 1110 and the second cover 1120 of FIG. 11A and FIG. 11B have different the fastening schemes but are similar to the configurations described earlier, and detailed explanations of other configurations of the first cover 1110 and the second cover 1120 shall be omitted.

Figure 12A:
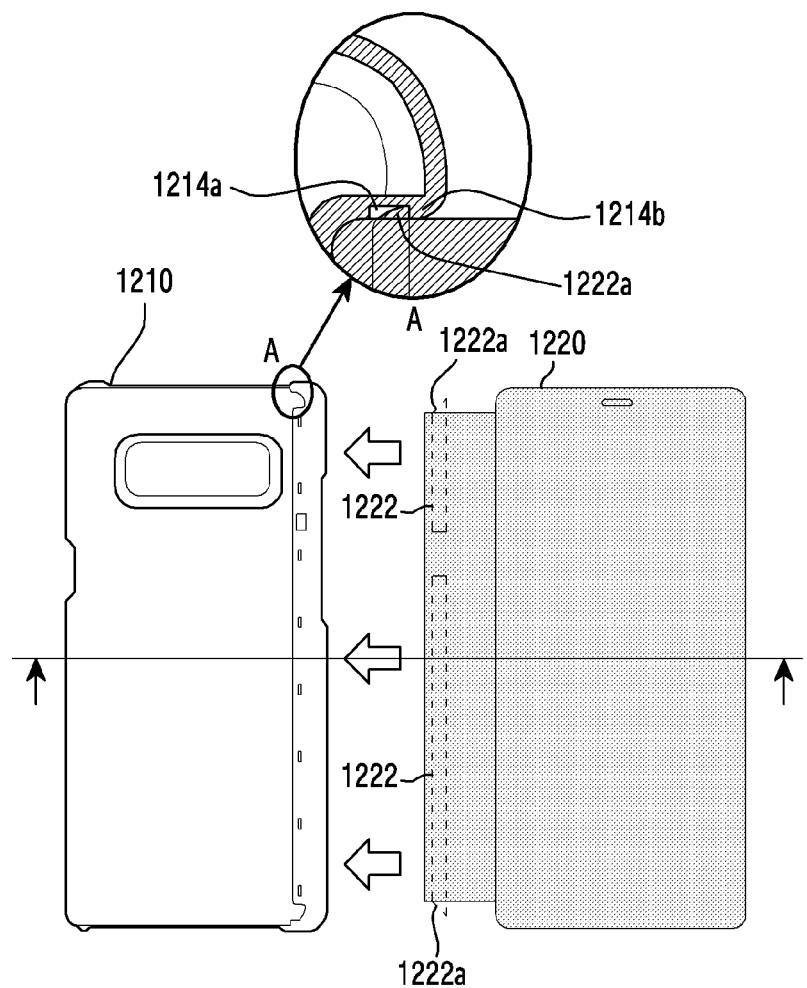
FIG. 12A is a view illustrating a coupling example of a first cover and a second cover according to an embodiment of the present invention.
Figure 12B:
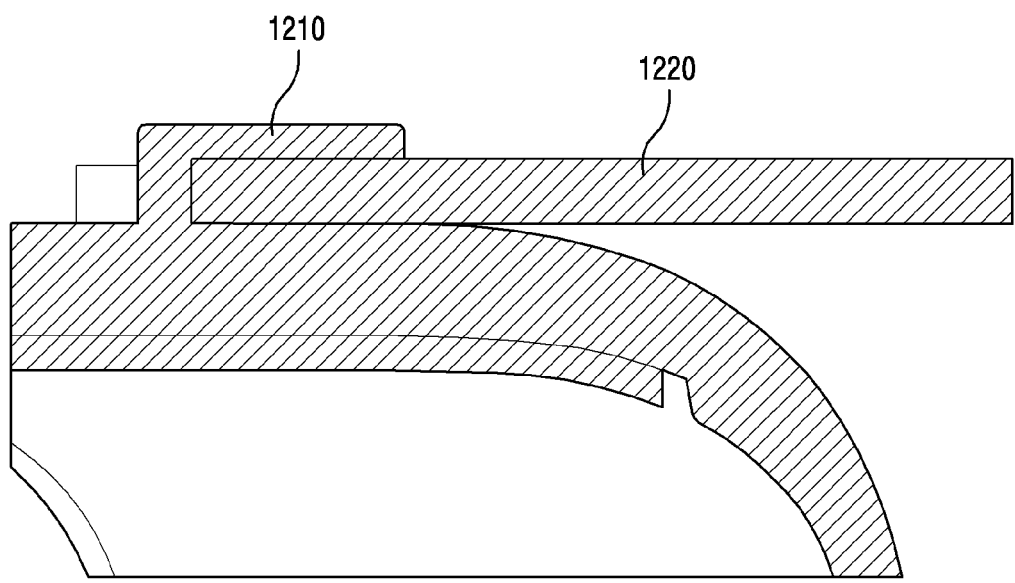
FIG. 12B is a cross-sectional view illustrating a coupling structure of the first cover and the second cover according to an embodiment of the present invention.
Figure 12C:
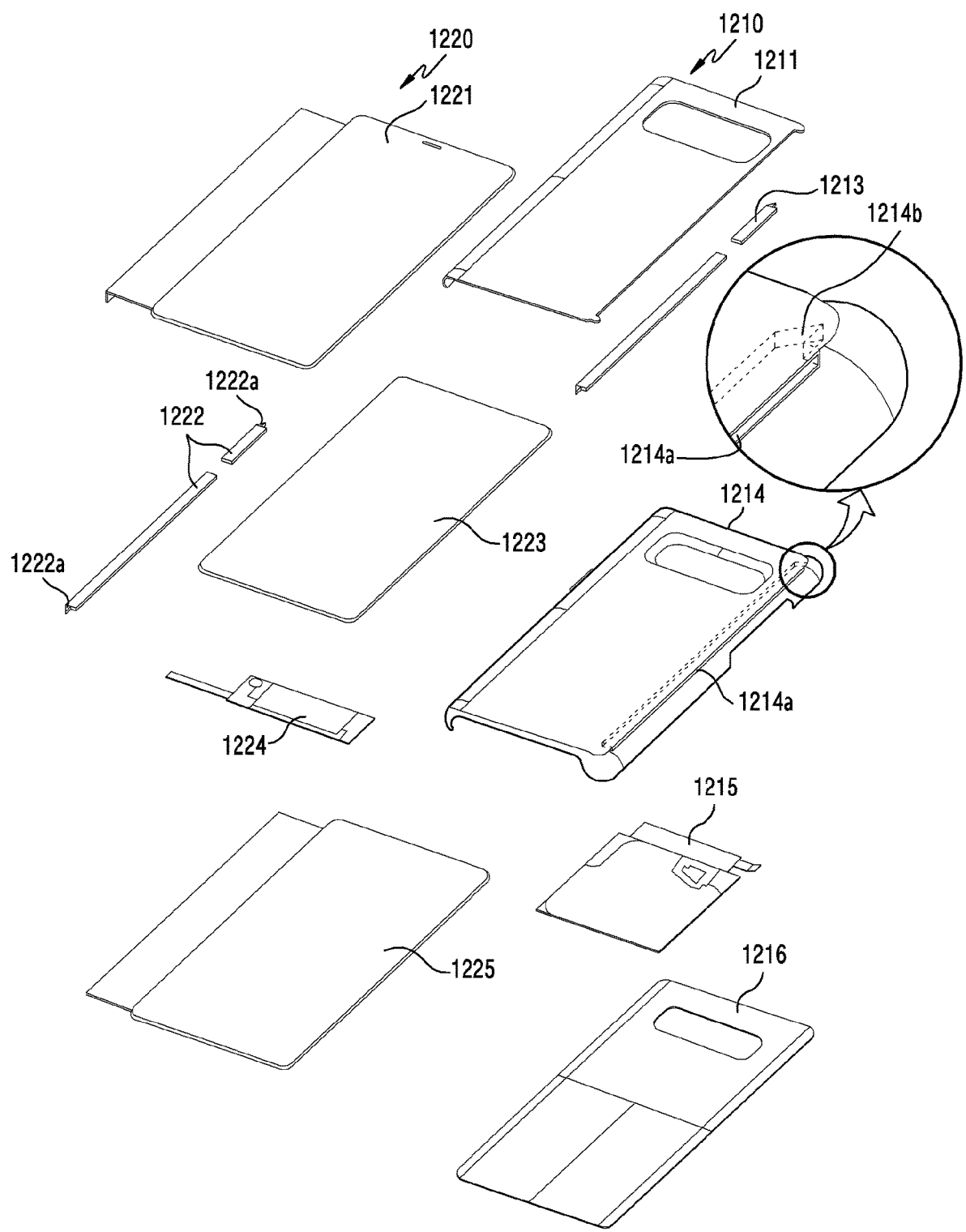
FIG. 12C is an exploded perspective view of the first cover and the second cover according to an embodiment of the present invention.

FIG. 12A is a view illustrating a coupling example of a first cover and a second cover according to an embodiment of the present invention, FIG. 12B is a cross-sectional view illustrating a coupling structure of the first cover and the second cover according to an embodiment of the present invention, and FIG. 12C is an exploded perspective view of the first cover and the second cover according to an embodiment of the present invention.

Referring to FIG. 12A through FIG. 12C, a first cover 1210 and a second cover 1220 according to an embodiment of the present invention may be coupled in a sliding manner.

The first cover 1210 according to an embodiment of the present invention may include an outer shell 1211, an auxiliary cover member 1213, a housing 1214, a control module 1215 and an inner shell 1216. The second cover 1220 according to an embodiment of the present invention may include an outer shell 1221, a coupling member 1222, a housing 1223, a light emitting module 1224 and an inner shell 1225.

According to an embodiment, the first cover 1210 may include a second groove 1214a formed in a substantially horizontal direction with the surface. The second groove 1214a may include a second hooking jaw 1214b.

According to an embodiment, the coupling member 1222 of the second cover 1220 may protrude substantially horizontally to the surface in the longitudinal direction, and have a second protrusion 1222a corresponding to the second hooking jaw 1214b. The first cover 1210 and the second cover 1220 may be coupled by a second hooking jaw 1214b and a second protrusion 1222a.

According to some embodiment, without the second hooking jaw 1214b and the second protrusion 1222a, the coupling member 1222 of the second cover 1220 may be coupled to the second groove 1214a of the first cover 1210 in the press fit manner.

Meanwhile, the first cover 1210 and the second cover 1220 of FIG. 12A through FIG. 12C have the different fastening schemes but are similar to the configurations described earlier, and detailed explanations of other configurations of the first cover 1210 and the second cover 1220 shall be omitted.

Figure 13A:
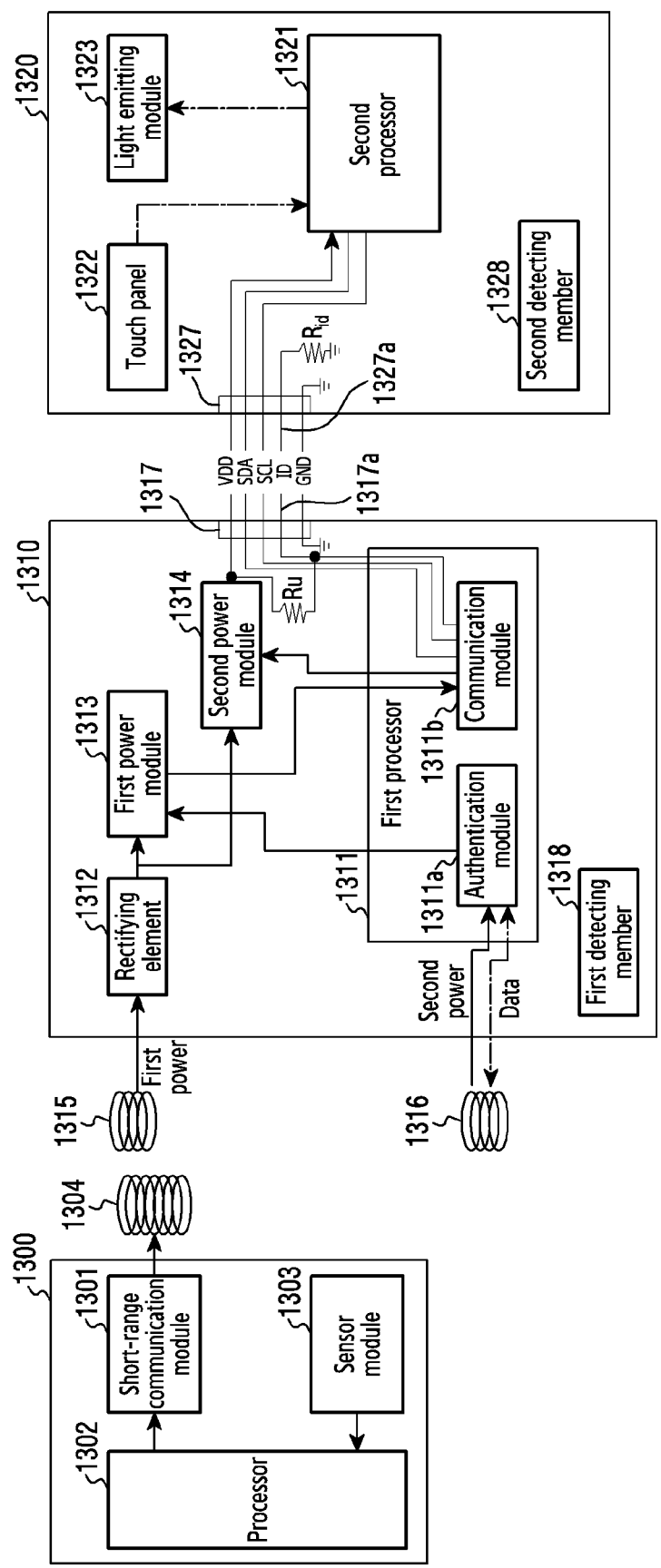
FIG. 13A is a block diagram illustrating a configuration of an electronic device, a first cover, and a second cover according to an embodiment of the present invention.

FIG. 13A is a block diagram illustrating a configuration of an electronic device, a first cover, and a second cover according to an embodiment of the present invention.

Referring to FIG. 13A, an electronic device 1300 according to an embodiment of the present invention may include a short-range communication module 1301, a processor 1302, a sensor module 1303, and a short-range communication antenna 1304.

According to an embodiment of the present invention, the short-range communication module 1301 may perform short-range communication with the first cover 1310 using a short-range wireless communication protocol (e.g., near field communication (NFC) protocol). For example, the short-range communication module 1301 may transmit first power, second power and/or data to the first cover 1310 through the short-range communication antenna 1304 under control of the processor 1302.

According to an embodiment of the present invention, under the control of the processor 1302, if the first cover 1310 is coupled to the electronic device 1300, the short-range communication antenna 1304 may transmit the first power to a first antenna 1315 of the first cover 1310, transmit the second power and an authentication request signal to a second antenna 1316 of the first cover 1310, and receive a response signal for the authentication request signal from the second antenna 1316 of the first cover 1310.

According to an embodiment, the short-range communication antenna 1304 may be implemented in a form similar to the first antenna 1315 of the first cover 1310. For example, the short-range communication antenna 1304 may be implemented in a loop shape.

According to an embodiment of the present invention, the sensor module 1303 may detect coupling of the first cover 1310. For example, the sensor module 1303 may detect approach of the first detecting member 1318. According to an embodiment, the sensor module 1303 may be a Hall integrated circuit (IC) for detecting a change of the magnetic field, and the first detecting member 1318 may be a magnetic body. This is only exemplary, and the electronic device 1300 may detect the coupling of the first cover 1310 in various manners. For example, the sensor module 1303 may be a switch which may be pressed by an inner surface of the first cover 1310 if the first cover 1310 is fastened. In this case, the first detecting member 1318 may be omitted.

According to an embodiment of the present invention, the sensor module 1303 may detect a state (e.g., open or close) of the second cover 1320. For example, the sensor module 1303 may detect the approach of the second detecting member 1328 positioned on the second cover 1320.

According to an embodiment, the sensor module 1303 may separately include a first sensor module for detecting the first detecting member 1318 and a second sensor module for detecting the second detecting member 1328.

According to an embodiment of the present invention, the processor 1302 may acquire first information related to the first cover 1310 or second information related to the second cover 1320, identify at least one of a type of the first cover 1310 or a type of the second cover 1320, based on at least one of the first information or the second information, and perform a designated operation based on at least one of the type of the first cover 1310 or the type of the second cover 1320.

According to an embodiment, if detecting the coupling of the first cover 1310 through the sensor module 1303, the processor 1302 may control the short-range communication module 1301 to transmit to the first cover 1310 second power and an authentication request signal for performing authentication between the electronic device 1300 and the first cover 1310 through the short-range communication antenna 1304. The authentication may be an operation for determining whether the first cover 1310 is genuine. The second power may have a quantity of the power (e.g., 1 mW) required to operate the authentication module 1311a of the first processor 1311 which performs the authentication between the electronic device 1300 and the first cover 1310.

According to an embodiment, if the authentication of the first cover 1310 is completed, the processor 1302 may control the short-range communication module 1301 to transmit the first power to the first cover 1310 through the short-range communication antenna 1304.

According to an embodiment, if the first cover 1310 is plural in number, the processor 1302, detecting the coupling of the first cover 1310, may identify the type (information related to the first cover) (e.g., a standing cover or a non-standing cover) of the first cover 1310. For example, the processor 1302 may receive an identifier including at least one of a product name or a model number from the first cover 1310 through the short-range communication antenna 1304, and identify the type of the first cover 1310 through the identifier.

According to an embodiment, if the second cover 1320 is coupled to the first cover 1310, the processor 1302 may obtain second information related to the second cover 1320 from the first cover 1310 through the short-range communication antenna 1304, and identify the type (information related to the second cover) (e.g., a normal cover, a view cover, or an LED cover) of the second cover 1320 based on the second information. For example, based on the second information, the processor 1302 may identify that the coupled second cover 1320 is one of a normal cover (e.g., the normal cover 300a of FIG. 3) which covers the whole front surface of electronic device 1300, a view cover (e.g., the view cover 300b of FIG. 3) which exposes part of the display, a transparent cover (e.g., the transparent cover 300c of FIG. 3), or an LED cover (e.g., the LED cover 300d of FIG. 3).

The second information may be a resistance value or a voltage value (or a digital value corresponding to the voltage value) of a first identification terminal 1317a of the first cover 1310. The voltage value of the first identification terminal 1317a of the first cover 1310 may differ depending on a value of resistance Rid (hereinafter, identification resistance) positioned between the second identification terminal 1317a of the second cover 1320 electrically connected with the first identification terminal 1317a and the ground.

According to some embodiment, the second information may be provided by the second processor 1321 of the second cover 1320. For example, if the first cover 1310 and the second cover 1320 are coupled and the power is supplied to the second processor 1321 of the second cover 1320, the second processor 1321 may transmit the second information indicating the type of the second cover 1320 to the first processor 1311 (or the communication module 1311b) of the first cover 1310 through a communication terminal SDA/SCL. The first processor 1311 of the first cover 1310 may transmit the second information to the electronic device 1300 through short-range wireless communication. According to an embodiment, the processor 1302 may identify the state (e.g., open or close) of the second cover 1320 through the sensor module 1303, and perform a designated operation based on the state of the second cover 1320. For example, if detecting the closed state of the second cover 1320, the processor 1302 may enter a standby mode (or a sleep mode). The standby mode may be a mode driven with minimal power for the electronic device 1300 to detect an event such as an incoming call request or an incoming message, or to detect the opening of the second cover 1320.

According to an embodiment, to display time through the light emitting module 1323 of the second cover 1320 in the closed state of the second cover 1320, the processor 1302 may transmit time information to the second cover 1320 through the first cover 1310. The second processor 1321 of the second cover 1320 may control the light emitting module 1323 to display current time, based on the time information.

According to an embodiment, if receiving a message in the closed state of the second cover 1320, the processor 1302 may transmit data (e.g., an LED lighting request signal, a display request signal of a message icon) for notifying (or informing) the reception of the message to the second cover 1320 through the first cover 1310. The second processor 1321 of the second cover 1320 may control the light emitting module 1323 to notify the reception of a text message, based on the data. For example, the processor 1321 may control the light emitting module 1323 to emit light according to a set rule, or to display a text message icon.

According to an embodiment, the processor 1302 may activate a display (e.g., the display device 160 of FIG. 1) in response to detecting that the second cover 1320 is changed from the closed state to the open state.

According to an embodiment, the processor 1302 may receive a touch input detected through a touch panel 1322 of the second cover 1320 from the first cover 1310, and perform a designated operation. For example, while a call request is received in the closed state of the second cover 1320 and the second cover 1320 displays a call icon using the light emitting module 1323, if receiving a touch input (e.g., a gesture input in a designated direction) around the call icon from the second cover 1320 through the first cover 1310, the processor 1302 may accept or reject the call.

Referring back to FIG. 13A, the first cover 1310 according to an embodiment of the present invention may include a rectifying element 1312, a first processor 1311, a first power module 1313, a second power module 1314, a first antenna 1315, a second antenna 1316, a first interface module 1317, and a first detecting member 1318.

According to an embodiment, the first detecting member 1318 may be used to detect whether the first cover 1310 is fastened to the electronic device 1300. The first detecting member 1318 may be provided at a position corresponding to the sensor module 1303 of the electronic device 1300. The first detecting member 1318 may be a magnetic body.

According to some embodiment, the first detecting member 1318 may be one of magnetic bodies (e.g., the magnetic body 220, the magnetic body 702b, the first magnetic body 902a, or the second magnetic body 902b) disposed on one side of the first cover 1310 for the coupling of the first cover 1310 and the second cover 1320.

According to an embodiment, the first antenna 1315 may receive the first power from the electronic device 1300. The first antenna 1315 may be implemented in a form similar to the short-range communication antenna 1304 of the electronic device 1300. For example, the first antenna 1315 may be implemented in a loop shape. The first antenna 1315 may be designed with a specific frequency band to minimize resonant frequency shifting due to the coupling with the short-range communication antenna 1304 of the electronic device 1300 in the coupling between the electronic device 1300 and the first cover 1310. For example, the specific frequency band may be any frequency band (e.g., 15 MHz through 30 MHz, etc.) for minimizing the resonant frequency shifting due to the coupling with the short-range communication antenna 1304 of the electronic device 1300.

According to an embodiment, the second antenna 1316 may receive an authentication request signal and second power for performing the authentication between the electronic device 1300 and the first cover 1310 from the electronic device 1300, and transmit a response signal to the electronic device 1300 under control of the processor 1311. Alternatively, the second antenna 1316 may receive data (e.g., an event signal) from the electronic device 1300, and transmit a response to the data received from the second cover 1320 to the electronic device 1300. According to an embodiment, the second antenna 1316 may be designed with the same frequency band (e.g., 10 MHz through 14.99 MHz) as the resonant frequency of the short-range communication antenna 1304 of the electronic device 1300.

According to an embodiment, the rectifying element 1312 may change (or rectify) the first power received through the first antenna 1315 from an analog current (AC) to a digital current (DC) and provide to the first power module 1313 and the second power module 1314.

According to an embodiment, the first power module 1313 may change the output voltage of the rectifying element 1312 to a specified voltage and provide to the communication module 1311b of the first processor 1311. For example, the first power module 1313 may change the output voltage of the rectifying element 1312 to a specific voltage (e.g., 3 V) used by the communication module 1311b of the first processor 1311 and provide to the communication module 1311b. The first power module 1313 may be a low drop out (LDO). The first power module 1313 may be controlled in on/off by the first processor 1311 or the authentication block 1311a. For example, if the authentication between the electronic device 1300 and the first cover 1310 is successful, the first power module 1313 may be turned on by the first processor 1311 or the authentication block 1311a.

According to some embodiment, if the output voltage of the rectifying element 1312 is a voltage used by the communication module 1311b of the first processor 1311, the first power module 1313 may not be provided, and the output power of the rectifying element 1312 may be directly supplied to the communication module 1311b of the first processor 1311.

According to an embodiment, the second power module 1314 may change the output voltage of the rectifying element 1312 to a designated voltage and provide to the second cover 1320. For example, the second power module 1314 may change the output voltage of the rectifying element 1312 to a specific voltage (e.g., 3V) used by the second processor 1321 of the second cover 1320 and transfer to the second cover 1320. The second power module 1314 may be an LDO. The second power module 1314 may be controlled in on/off by the first processor 1311 or the communication module 1311b. For example, if the coupling of the second cover 1320 is detected, the second power module 1314 may be turned on by the first processor 1311 or the communication module 1311b.

According to some embodiment, if the output voltage of the rectifying element 1312 is equal to the voltage used by the second processor 1321, the second power module 1314 may be replaced by a switch which connects or disconnects a path between the output of the rectifying element 1312 and the second processor 1321.

According to some embodiment, the second power module 1314 may be replaced with a switch, and the second cover 1320 may include a power module. For example, the output power of the rectifying element 1312 may be directly transmitted to the second cover 1320 through the switch if the second cover 1320 is coupled, and may be changed to a voltage for driving at least one electronic circuit (e.g., the second processor 1321, the touch panel 1322, the light emitting module 1323, etc.) by the power module included in the second cover 1320. In addition, if there are multiple voltages for driving at least one electronic circuit, the second cover 1320 may include a plurality of power modules.

According to an embodiment, the first interface module 1317 may provide an interface for a wired connection with the second cover 1320. For example, the first interface module 1317 may be connected with the second interface module 1327 of the second cover 1320. The first interface module 1317 may include a metal terminal exposed to the outside of the first cover 1310, and the second interface module 1327 may include a pogo pin.

According to an embodiment, the first interface module 1317 may include a power terminal VDD, a ground terminal GND, a communication terminal SDA/SCL and a first identification terminal 1317a.

The power terminal VDD is a terminal for supplying the power to the second cover 1320. The ground terminal GND is a terminal for the connection with the ground of the second cover 1320. According to some embodiment, the ground terminal GND may be used as a detection terminal for detecting whether the second cover 1320 is coupled.

The first identification terminal 1317a may be a terminal for recognizing the type of the second cover 1320. If the first cover 1310 and the second cover 1320 are coupled, the first identification terminal 1317a may be connected with the identification resistance Rid positioned between the second identification terminal 1327a of the second interface module 1327 of the second cover 1320 and the ground. Herein, the identification resistance Rid may have a different value according to the type of the second cover 1320.

According to some embodiment, the first identification terminal 1317a may be plural. The plurality of the first identification terminals may be connected with the second identification terminals respectively of the second interface module 1327 of the second cover 1320 connected with a pull-up resistor or a pull-down resistor. For example, as shown in <Table 1>, if the second cover 1320 is a right-handed LED cover, the 2-1 identification terminal through the 2-4 identification terminals of the second interface module 1327 may be connected with the pull-up resistor.

Alternatively, if the second cover 1320 is a view cover, the 2-1 identification terminal and the 2-2 identification terminal of the second interface module 1327 may be connected with the pull-up resistor, and the 2-3 identification terminal and the 2-4 identification terminal may be connected with the pull-down resistor.

The communication terminal SDA/SCL may be an interface for the communication between the first processor 1311 of the first cover 1310 and the second processor 1321 of the second cover 1320. FIG. 13A illustrates that I2C serial communication requiring two communication terminals is used, but this is only an example and does not limit the embodiment of the present invention. For example, the first processor 1311 and the second processor 1321 may communicate using various communication protocols, and the number of the communication terminals may vary according to the communication protocol.

According to an embodiment, the first processor 1311 may control the authentication procedure with the electronic device 1300 and a procedure for identifying the type of the second cover 1320. The first processor 1311 may include the authentication module 1311a and the communication module 1311b.

According to an embodiment, if the first cover 1310 is coupled to the electronic device 1300, the authentication module 1311a may receive the second power for driving and an authentication request signal through the second antenna 1316. The authentication module 1311a may transmit a response signal for the authentication request to the electronic device 1300 through the second antenna 1316. The authentication module 1311a may turn on the first power module 1313, if the authentication is completed (or successful).

According to an embodiment, the communication module 1311b may be activated by receiving the power from the first power module 1313. The communication module 1311b may turn on the second power module 1314 to supply the power to the second cover 1320 if the second cover 1320 is coupled. According to an embodiment, if receiving data from the electronic device 1300 through the second antenna 1316, the communication module 1311b may forward the received data to the second cover 1320. According to an embodiment, if receiving an event (e.g., an incoming call) requiring a response from the electronic device 1300 through the second antenna 1316, the communication module 1311b may forward the received event to the second cover 1320. If receiving the response for the event from the second cover 1320, the first processor 1311 may forward a response (e.g., a call accept or reject) to the electronic device 1300 through the second antenna 1316.

According to an embodiment, the communication module 1311b may transmit identification information for determining the type of the second cover 1320 if the second cover 1320 is coupled to the electronic device 1300 through the second antenna 1316.

According to some embodiment, the first processor 1311 may determine the type of the second cover 1320 and then transmit its result to the electronic device 1300 through the second antenna 1316.

Referring back to FIG. 13A, the second cover 1320 according to an embodiment of the present invention may include the second processor 1321, the touch panel 1322, the light emitting module 1323, the second interface module 1327, and the second detecting member 1328.

According to an embodiment, the second detecting member 1328 may be used to detect the state (e.g., open or close) of the second cover 1320. The second detecting member 1328 may be provided at a position corresponding to the sensor module 1303 of the electronic device 1300. The second detecting member 1328 may be a magnetic body.

According to an embodiment, the light emitting module 1323 may be activated with the power received from the second power module 1314 of the first cover 1310, and perform an operation (or a function) under the control of the second processor 1321 based on data received from the communication module 1311b included in the first processor 1311 of the first cover 1310. For example, the light emitting module 1323 may display information about the event using data (e.g., letters, numbers, special characters, emoticons, etc.) transmitted from the electronic device 1300 through the first cover 1310 or display information reflecting at least one effect of a dimming effect, an animation effect, and an effect for moving up, down, left, and right. For example, the data may include an image for display, an effect to be applied to the image, or a time of the image display. According to an embodiment, the light emitting module 1323 may include a plurality of light emitting elements. The light emitting elements may be arranged in various forms (e.g., a matrix form).

According to some embodiment, the light emitting module 1323 may be replaced by a display such as an organic light emitting diode (OLED), an electrophoretic display (EPD), or a liquid crystal display (LCD) or electronic ink (E-ink), or may be omitted.

According to an embodiment, the touch panel 1322 may detect occurrence of an input event. For example, the touch panel 1322 may detect an input event for accepting or rejecting an event (e.g., an incoming call) generated in the electronic device 1300. The touch panel 1322 may use, for example, at least one of a capacitive type, a pressure-sensitive type, an infrared scheme, or an ultrasonic scheme. According to some embodiment, the touch panel 1322 may further include a tactile layer, to provide a tactile reaction to the user.

According to an embodiment, if an input event occurs, the touch panel 1322 may transmit input data of the generated input event to the second processor 1321. According to an embodiment, the touch panel 1322 may be positioned around (e.g., on or below) the light emitting module 1323. The touch panel 1322 may be generated to match the size of the light emitting module 1323 or to be larger or smaller.

According to an embodiment, the second interface module 1327 is an interface for a wired connection with the first cover 1310, and may include a power terminal VDD, a ground terminal GND, a communication terminal SDA/SCL and a second identification terminal 1327a.

The power terminal VDD may be connected to the second processor 1321. The ground terminal GND may be connected to a ground terminal of the first cover 1310, and may be grounded.

The communication terminal SDA/SCL may be an interface for communication between the second processor 1321 and the first processor 1311 of the first cover 1310. Meanwhile, although I2C serial communication requiring two communication terminals is illustrated as an example in FIG. 13A, which is only an example, and it does not limit the embodiment of the present invention. For example, the first processor 1311 and the second processor 1321 may communicate using various communication protocols, and the number of the communication terminals may vary according to the communication protocol.

The second identification terminal 1327a may be connected with identification resistance Rid. The identification resistance Rid may have a different value depending on the type of the second cover 1320. According to some embodiment, the second identification terminals 1327a may be plural in number. For example, the second identification terminal 1327a may be four (e.g., a 2-1 identification terminal, a 2-2 identification terminal, a 2-3 identification terminal, and a 2-4 identification terminal).

According to an embodiment, the second processor 1321 may be driven by the power supplied from the second power module 1314 of the first cover 1310. The second processor 1321 may be a micro controller unit (MCU), a micro process unit (MPU), an application processor (AP), or a field programmable gate array (FPGA).

According to an embodiment, the second processor 1321 may control the touch panel 1322 and the light emitting module 1323. For example, the second processor 1321 may control the light emitting module 1323 to display data (e.g., numbers, letters, icons, time) received from the electronic device 1300 through the first cover 1310. Alternatively, the second processor 1321 may control the light emitting module 1323 to notify (e.g., to display a call icon) of an event (e.g., an incoming call) received from the electronic device 1300 through the first cover 1310.

According to an embodiment, the second processor 1321 may transmit a response for the event to the first processor 1311 of the first cover 1310. For example, if receiving the event, the second processor 1321 may detect whether an input event to the touch panel 1322 occurs. If an input event to the touch panel 1322 does not occur for a designated time, the second processor 1321 may transmit a response indicating that the input event is not generated to the electronic device 1300 through the first cover 1310.

According to an embodiment, if an input event (e.g., accept or reject) to the touch panel 1322 occurs, the second processor 1321 may transmit a response including the input event to the electronic device 1300 through the first cover 1310.

According to some embodiment, the second processor 1321 may control the light emitting module 1323 to display data (e.g., letters, numbers, and icons for indicating an incoming call, an incoming message, an alarm, a timer, a battery level, music playback, a notification, volume control, etc.) related to an event occurrence (e.g., an incoming call, an incoming message, an alarm, a timer, a battery level, music playback, a notification, volume control, etc.) of the electronic device 1300. If receiving the input to the displayed data (e.g., acceptance or rejection for an incoming call, an incoming message, an alarm, a timer, a battery level, music playback, a notification, volume control, etc.) through the touch panel 1322, the second processor 1321 may forward the received input to the electronic device 1300 through the first cover 1310.

Although not illustrated in FIG. 13A, the first cover 1310 and the second cover 1320 may further include a detection means. For example, if using ground detection, the first processor 1311 may further include a detection terminal, and the detection terminal of the first processor 1311 may be electrically connected with a ground terminal GND of the first interface module 1317. The ground terminal GND of the first interface module 1317 is not connected to a ground area of the electronic device or the first cover if it is used as the detection terminal, and may be connected with a pull-up resistor which uses the power of the rectifying element 1312 or the first power module 1313. If the second cover 1320 is coupled, the ground terminal GND of the first interface module 1317 connected with the pull-up resistor may be connected to the ground terminal GND of the second interface module 1327 connected with the pull-down resistor. In this case, the ground terminal GND of the first interface module 1317 changes from a high signal having the voltage equal to or greater than a designated value (e.g., 1 V) to a low signal having the voltage less than a designated value (e.g., 1 V). The first processor 1311 may detect the coupling of the second cover 1320 through this signal change. This is merely an example, and does not limit an embodiment of the present invention. For example, the first interface module 1317 does not use the ground terminal GND as the detection terminal, and may separately include a detection terminal connected with a pull-up resistor.

According to some embodiment, the electronic device 1300 may operate using modulation (e.g., type S protocol) not to recognize the first antenna 1315 and the second antenna 1316 of the first cover 1310 as a general NFC tag (or NFC antenna). For example, if an external NFC tag is detected, the electronic device 1300 may perform an operation with the external NFC tag using an NFC standard protocol (e.g., type A, B, F protocol). By contrast, if the first cover 1310 is fastened, the electronic device 1300 may detect the first detecting member 1318 provided in the first cover 1310, and communicate with the first cover 1310 using a designated NFC protocol (e.g., type S protocol) different from the NFC standard protocol. Hence, since the electronic device 1300, which performs the communication with the external NFC tag and the first cover 1310 using the different protocols, may reduce malfunction.

Figure 13B:
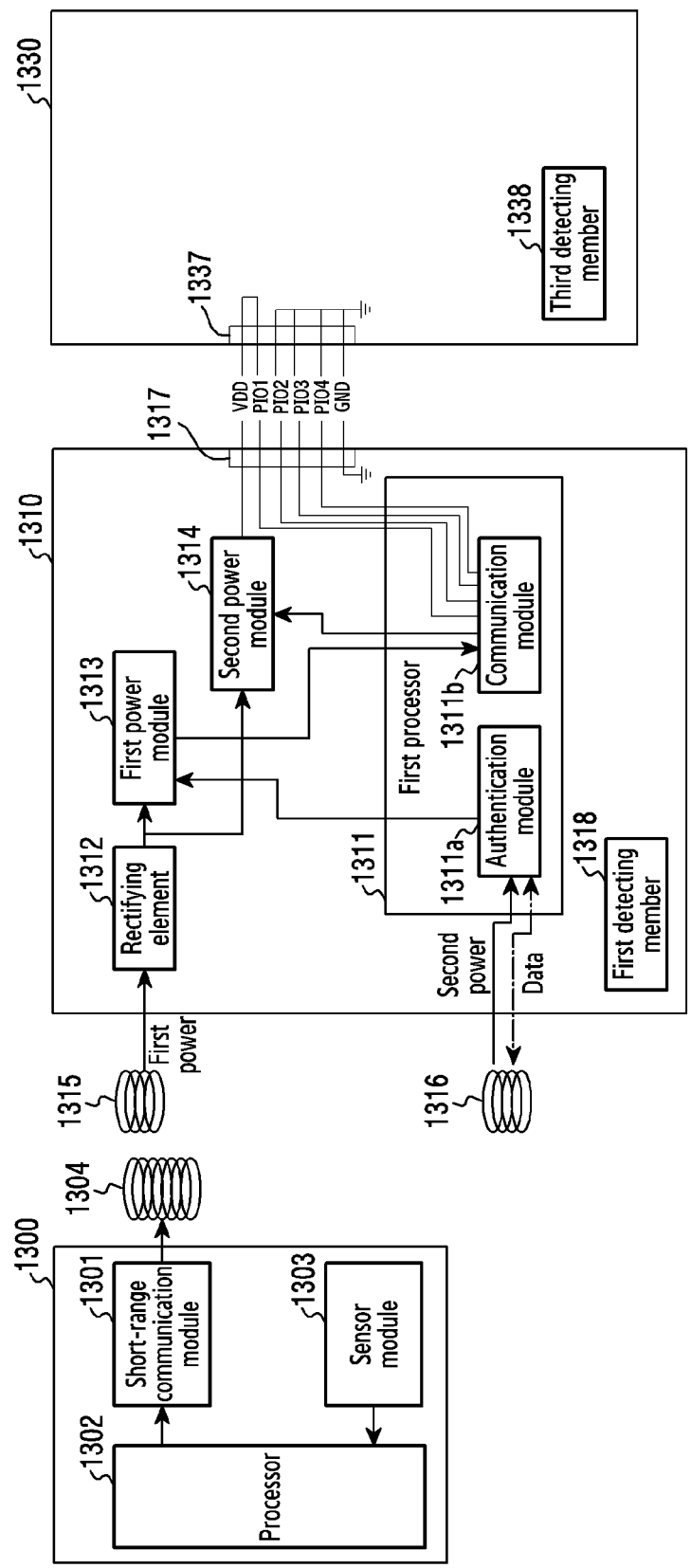
FIG. 13B is a block diagram illustrating a configuration of the electronic device, the first cover, and the second cover according to an embodiment of the present invention.

FIG. 13B is a block diagram illustrating the configuration of the electronic device, the first cover, and the second cover according to an embodiment of the present invention.

Referring to FIG. 13B, the electronic device 1300 and the first cover 1310 according to an embodiment of the present invention are the same as in FIG. 13A, and their detailed descriptions will be omitted.

The second cover 1330 according to an embodiment of the present invention may be a normal cover which covers the entire front surface of the electronic device 1300. That is, the second cover 1330 may not include an electronic circuit requiring the power. The second cover 1330 may include a third interface module 1375 and a third detecting member 1338.

According to an embodiment, the third interface module 1375 may include a power terminal VDD, four identification terminals PIO1, PIO2, PIO3, and PIO4, and a ground terminal GND. The four identification terminals PIO1, PIO2, PIO3, and PIO4 may be connected with the power terminal VDD or the ground terminal GND. If there are multiple identification terminals, the second information may be a binary digital value. For example, the second information may have a 4-bit digital value as shown in <Table 1> below.

TABLE 1

|  | 2-1 ID terminal | 2-2 ID terminal | 2-3 ID terminal | 2-4 ID terminal |
| --- | --- | --- | --- | --- |
| Normal cover | 1 | 0 | 0 | 0 |
| View cover | 1 | 1 | 0 | 0 |
| Transparent cover | 1 | 1 | 1 | 0 |
| LED cover (right hand) | 1 | 1 | 1 | 1 |
| LED cover (left hand) | 1 | 0 | 1 | 1 |

The processor 1302 of the electronic device 1300 or the first processor 1311 of the first cover 1310 may recognize the type of the second cover 1330 based on the 4-bit digital value. For example, as shown in FIG. 13B, if the normal cover is matched to the identifier of "1000" as shown in <Table 1>, the 2-1 identification terminal PIO1 may be connected to the power terminal VDD, and the 2-2 identification terminal PIO2 through the 2-4 identification terminal PIO4 may be connected to the ground terminal GND. Meanwhile, the <Table 1> is only an example, and does not limit the embodiment of the present invention. For example, the 2-1 identification terminal PIO1 through the 2-4 identification terminal PIO4 may be connected to the power terminal VDD or the ground terminal GND to correspond to the identifier designated in the normal cover.

Meanwhile, the third detecting member 1338 has the same configuration as the second detecting member 1328, and its detailed descriptions shall be omitted.

According to some embodiment, if the second cover 1330 does not include the electronic circuit requiring the power, and some configuration (e.g., the first authentication module 1311a for the authentication with the electronic device 1300 and the communication module 1311b for identifying the type of the second cover 1330) of the first processor 1311 may be driven by the second power received through the second antenna 1316, the first processor 1311 or the authentication module 1311a may request the electronic device 1300 not to transmit the first power greater than the second power even if the second cover 1330 is coupled.

Figure 14A:
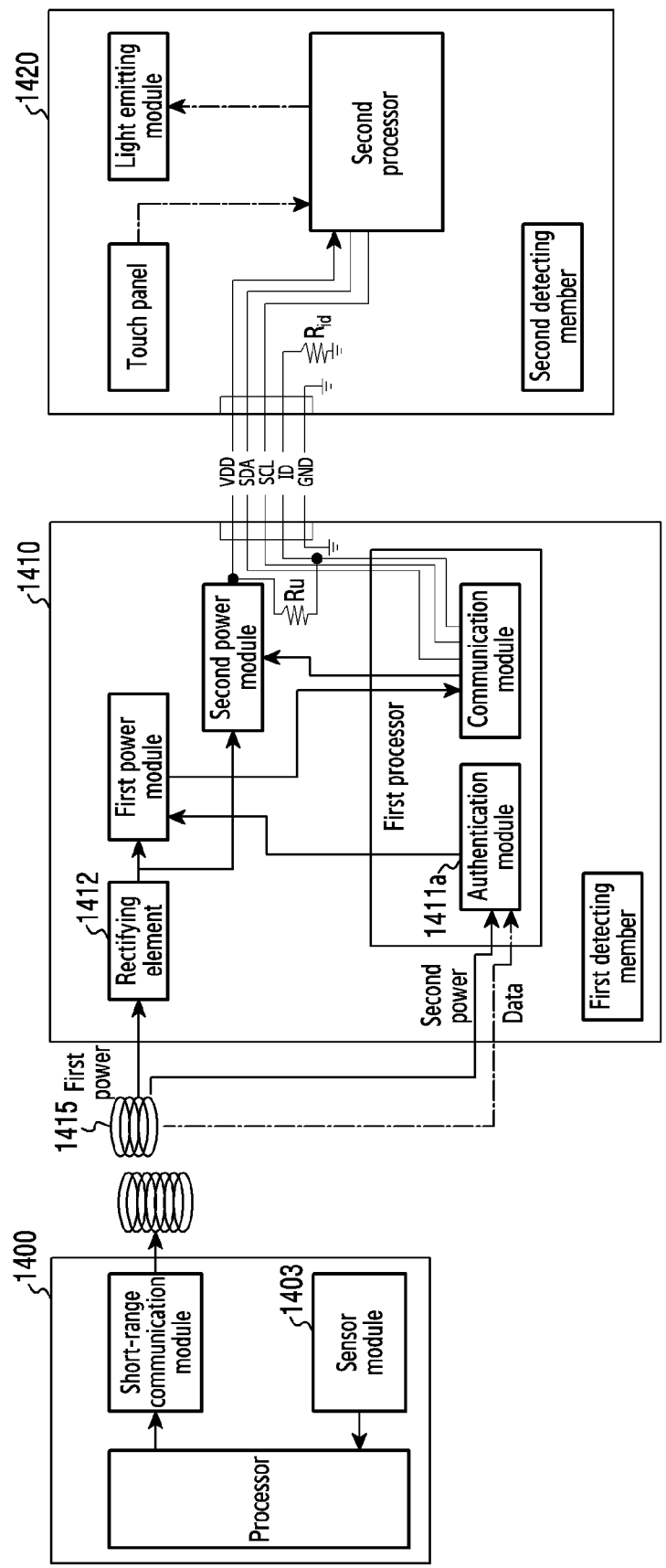
FIG. 14A is a block diagram illustrating a configuration of an electronic device, a first cover, and a second cover according to an embodiment of the present invention.
Figure 14B:
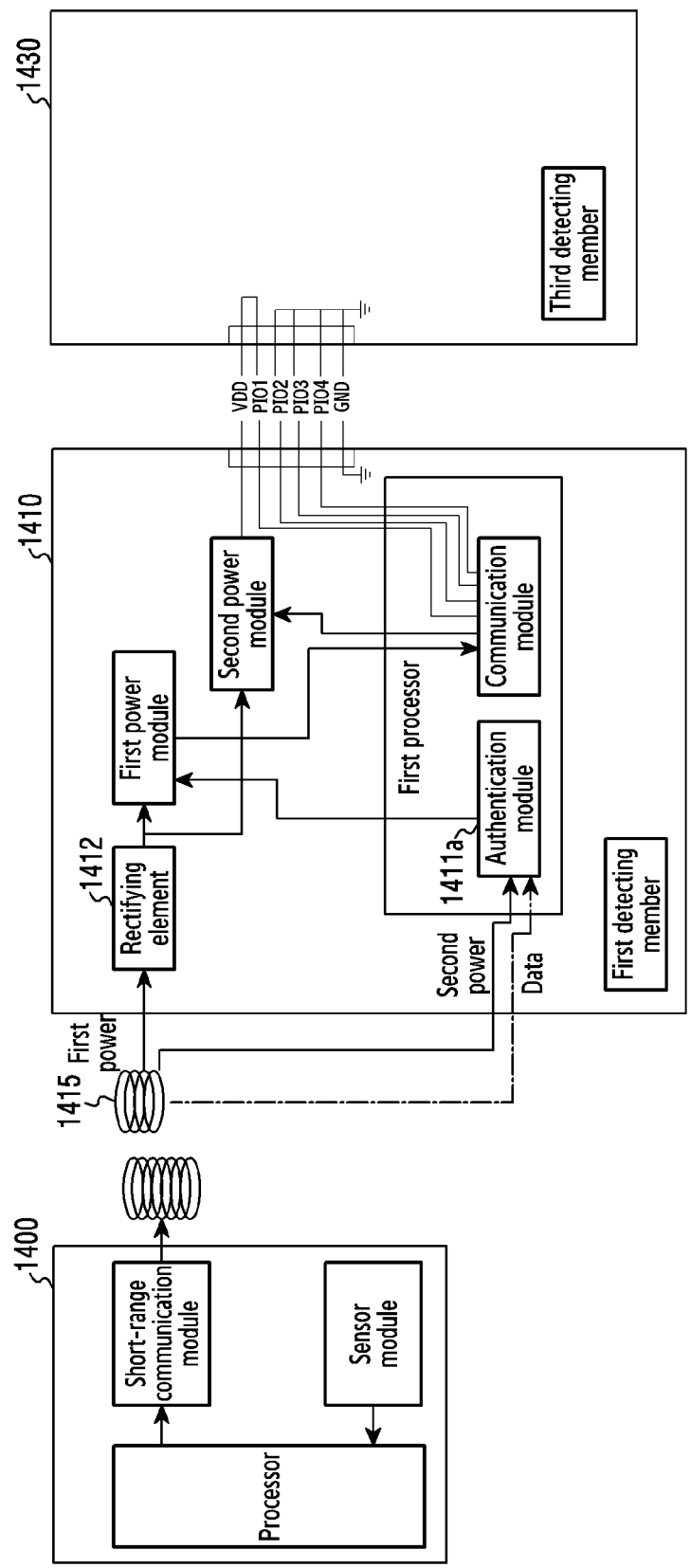
FIG. 14B is a block diagram illustrating a configuration of the electronic device, the first cover, and the second cover according to an embodiment of the present invention.

FIG. 14A is a block diagram illustrating a configuration of an electronic device, a first cover, and a second cover according to an embodiment of the present invention, and FIG. 14B is a block diagram illustrating the configuration of the electronic device, the first cover, and the second cover according to an embodiment of the present invention.

Referring to FIG. 14A and FIG. 14B, an electronic device 1400 and second covers 1420 and 1430 according to an embodiment of the present invention may be the same as the electronic device 1300 and the second covers 1320 and 1330 of FIG. 13A and FIG. 13B respectively. Hence, their detailed descriptions will be omitted.

According to an embodiment, a first cover 1410 may include one antenna 1415 which serves as the first antenna 1315 and the second antenna 1316 of FIG. 13A and FIG. 13B. For example, a rectifying element 1412 may receive first power from the antenna 1415, and an authentication module 1411a may receive second power and an authentication request signal from the antenna 1415.

As such, since the first cover 1410 is similar to the first cover 1310 of FIG. 13A and FIG. 13B except that it includes one antenna 1415, detailed descriptions thereof will be omitted.

According to embodiments of the present invention, an electronic device (e.g., the electronic device 101, the electronic device 1300, the electronic device 1400) may comprise a housing; a first cover (e.g., the first cover 200, the first cover 700, the first cover 910, the first cover 1110, the first cover 1210, the first cover 1310, the first cover 1410) coupled with at least part of the housing, and comprising at least one first identification terminal; a second cover (e.g., the second cover 300, the second cover 920 and 930, the second cover 1120, the second cover 1220, the second cover 1320 and 1330, the second cover 1420 and 1430) coupled with at least part of the first cover, and comprising at least one second identification terminal which is electrically connectable with the first identification terminal; and a processor (e.g., the processor 120, the processor 1302). The processor may be configured to obtain at least one of first information related to the first cover or second information related to the second cover, identify at least one of a type of the first cover or a type of the second cover based on at least one of the first information or the second information, and perform a designated operation based on at least one of the type of the first cover or the type of the second cover.

According to various embodiments, the electronic device may further comprise: a sensor module (e.g., the sensor module 176 and 1303) configured to detect whether the first cover is coupled or a state of the second cover; a short-range communication antenna (e.g., the short-range communication antenna 1304) positioned inside the housing or forming a part of the housing; and a short-range wireless communication circuit (e.g., the short-range communication module 1301) electrically connected with the short-range communication antenna, and configured to support a short-range wireless communication protocol According to various embodiments, the first cover may comprise: a first interface module (e.g., the first interface module 1317) comprising the first identification terminal, and used to couple the second cover; a first detecting member (e.g., the first detecting member 1318) disposed at a position corresponding to the sensor module, and used to detect coupling of the first cover; at least one antenna (e.g., the first antenna 1315, the second antenna 1316, the antenna 1415) configured to receive power for driving at least one of the first cover or the second cover and data for control from the electronic device through the short-range communication antenna; a rectifying circuit (e.g., the rectifying element 1312) connected to the at least one antenna; at least one power module (e.g., the first power module 1313, the second power module 1314) connected to the rectifying circuit; and a first processor (e.g., the first processor 1311) configured to perform an authentication procedure with the electronic device based on the data received from the at least one antenna, and to detect coupling of the second cover According to various embodiments, the second cover may comprise: a second interface module (e.g., the second interface module 1327) comprising the second identification terminal, and coupled with the first interface module; and a second detecting member (e.g., the second detecting member 1328) used to detect an open state or a close state of the second cover.

According to various embodiments, the second cover may further comprise: at least one electronic circuit (e.g., the touch panel 1322, the light emitting module 1323) driven by the power, and performing a designated function; and a second processor (e.g., the second processor 1321) configured to control the at least one electronic circuit.

According to various embodiments, the first interface module and the second interface module may further comprise: a communication terminal for transmitting and receiving the data.

According to various embodiments, the processor may be configured to adjust a first power transmitted to the first cover through the short-range wireless communication antenna, based on the type of the second cover.

According to various embodiments, the first processor may be configured to transmit a second power for driving an authentication module of the first cover and an authentication request signal to the first cover by activating the short-range wireless communication circuit when detecting coupling of the first cover, and control the short-range wireless communication circuit to receive a response signal from the first cover.

According to various embodiments, the first interface module and the second interface module may further comprise a detection terminal for detecting coupling of the second cover.

According to various embodiments, the at least one power module may comprise a first power module for supplying first power to the first processor and a second power module for supplying second power for driving the second cover. The first processor may be configured to supply power to the second cover by activating the second power module when detecting coupling of the second cover.

According to various embodiments, the first cover may comprise at least one magnetic body (e.g., the magnetic body 220, the second magnetic body 702*b*, the first magnetic body 902*a*, the second magnetic body 902*b*) on one side, and the second cover comprises at least one metal member (e.g., the metal member 320) at a position corresponding to the magnetic body. The first cover and the second cover may be coupled by attraction between the metal member and the magnetic body.

According to various embodiments, the first cover may comprise a first groove formed in a direction substantially perpendicular to a surface, and having a first hooking jaw. The second cover may comprise a first coupling member having a first protrusion which protrudes in a direction substantially perpendicular to the surface and corresponds to the first hooking jaw. The first cover and the second cover may be coupled such that the first coupling member is inserted into the first groove and the first protrusion is hooked by the first hooking jaw.

According to various embodiments, the first cover may comprise a second groove formed in a direction substantially horizontal with a surface, and having a second hooking jaw. The second cover may comprise a second coupling member having a second protrusion which protrudes in a direction substantially horizontal with the surface and corresponds to the second hooking jaw. The first cover and the second cover may be coupled such that the second coupling member is inserted into the second groove and the second protrusion is hooked by the second hooking jaw.

According to various embodiments, the electronic device may further comprise an auxiliary cover member coupled to a part of the first cover in which the first identification terminal is positioned not to expose the first identification terminal to outside when the second cover is not coupled.

According to various embodiments, the second cover may comprise a right-handed cover which is opened to left, and a left-handed cover which is opened to right. The first identification terminal is positioned symmetrically on a right side and a left side of the first cover. The auxiliary cover member may comprise a first auxiliary cover member coupled to the first cover not to expose the first identification terminal positioned on the right side of the first cover when the right-handed cover is coupled, and a second auxiliary cover member coupled to the first cover not to expose the first identification terminal positioned on the left side of the first cover when the left-handed cover is coupled.

According to embodiments of the present invention, an electronic device (e.g., the first cover 200, the first cover 700, the first cover 910, the first cover 1110, the first cover 1210, the first cover 1310, the first cover 1410) may include a housing; at least one antenna (e.g., the first antenna 1315, the second antenna 1316, the antenna 1415) configured to receive power, and transmit and receive a signal from a first external electronic device (e.g., the electronic device 101, the electronic device 1300, the electronic device 1400); an interface module (e.g., the first interface module 1317) including an identification terminal for identifying a type of a second external electronic device (e.g., the second cover 300, the second cover 920 and 930, the second cover 1120, the second cover 1220, the second cover 1320 and 1330, the second cover 1420 and 1430) coupled to the electronic device; and a processor (e.g., the first processor 1311). The processor may be configured to perform an authentication procedure with the first external electronic device when detecting coupling with the first external electronic device, after finishing the authentication, when detecting coupling of the second external electronic device identify the second external electronic device through the identification terminal and transmit identification information related to the second external electronic device to the first external electronic device, and receive, from the first external electronic device, data for conducting a designated operation based on a type of the second external electronic device through the at least one antenna.

Figure 15:
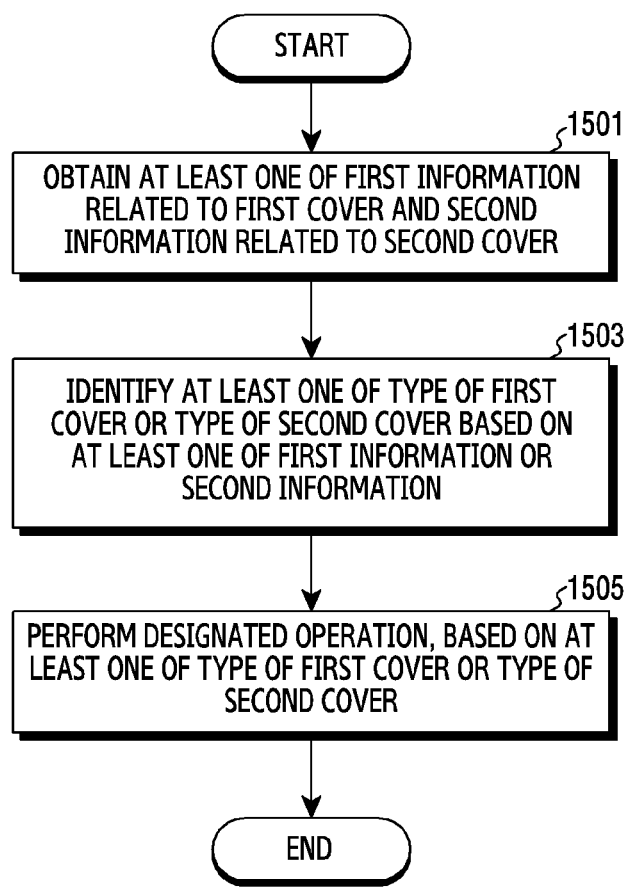
FIG. 15 is a flowchart illustrating an operating method of an electronic device according to an embodiment of the present invention.

FIG. 15 is a flowchart illustrating an operating method of an electronic device according to an embodiment of the present invention.

Referring to FIG. 15, a processor (e.g., the processor 120, the processor 1302) of an electronic device (e.g., the electronic device 101, the electronic device 1300, the electronic device 1400) according to an embodiment of the present invention) may acquire, in operation 1501, at least one of first information related to a first cover (e.g., the first cover 200, the first cover 700, the first cover 910, the first cover 1110, the first cover 1210, the first cover 1310, the first cover 1410) or second information related to a second cover (e.g., the second cover 300, the second cover 920 and 930, the second cover 1120, the second cover 1220, the second cover 1320 and 1330, and the second cover 1420 and 1430). For example, if the coupling of the first cover is detected by a sensor module (e.g., the sensor module 1303), the processor may transmit second power for driving the first cover to the first cover through a short-range communication module (e.g., the short-range communication module 1301) by activating a short-range communication antenna (e.g., the short-range communication antenna 1304), and obtain (e.g., receive from the first cover) the first information related to the first cover. According to some embodiment, if detecting the coupling of the first cover, the processor may perform the authentication procedure for identifying whether the product is genuine by transmitting an authentication request signal to the first cover. The first information may include at least one of a product name or a model number of the first cover. The first information may be transmitted to the electronic device by the first cover through a second antenna (e.g., the second antenna 205b, the second antenna 1316, the antenna 1415).

Meanwhile, if being coupled to the electronic device, the first cover may receive the first power for driving the second cover through the first antenna (e.g., the first antenna 205a, the first antenna 1315, and the antenna 1415), and wait for the coupling of the second cover. If the second cover is coupled to the first cover, the processor may receive second information related to the second cover from the first cover. The second information may be identification information (e.g., a resistance value or a digital value) obtained by the first cover through at least one identification terminal.

The processor according to an embodiment of the present invention may identify at least one of the type of the first cover or the type of the second cover, based on at least one of the first information or the second information, in operation 1503. For example, the processor may identify the type of the first cover through the first information (e.g., a product name or a model number of the first cover). According to some embodiment, the processor may transmit the first information to a designated server, and receive the type of the first cover. In addition, the processor may identify the type of the second cover based on the second information.

For example, the processor may identify a second cover matching the second information using the table as shown in <Table 1>. According to some embodiment, the first cover may identify the type of the second cover, and transmit the identified type of the second cover to the electronic device. Alternatively, identification information related to the first cover and the second cover may be transmitted to the electronic device.

The processor according to an embodiment of the present invention may perform a designated operation based on at least one of the type of the first cover or the type of the second cover, in operation 1505. For example, the processor may identify a right-handed cover or a left-handed cover, and thus control to provide a corresponding UI. According to another embodiment, if the second cover is an LED cover, the processor may provide various information through a light emitting module of the second cover and/or a display of the electronic device based on the state (e.g., open or close) of the second cover. According to yet another embodiment, the processor may receive an input from the LED cover, and perform a corresponding operation (or function).

The processor according to various embodiments may determine a level of the first power transmitted through the short-range communication antenna 1304 according to the identified type of the second cover, and output the first power at the determined level. For example, the processor may not output the first power if the second cover does not require power. According to another embodiment, the processor may adjust (control) the level of the first power according to the quantity of the power required by the second cover. For example, the processor may control to output the first power at a first level if the light emitting module (e.g., the light emitting module 1323) and a touch panel (e.g., the touch panel 1322) of the second cover require power of the first level, and to output the first power at a second size if the light emitting module and the touch panel of the second cover requires power of the second level which is greater than the first level. The level of the power required by the second cover may be matched with each cover and prestored, in a similar manner to <Table 1>.

According to various embodiments of the present invention, an operating method of an electronic device (e.g., the electronic device 101, the electronic device 1300, the electronic device 1400) which has a first cover (e.g., the first cover 200, the first cover 700, the first cover 910, the first cover 1110, the first cover 1210, the first cover 1310, the first cover 1410) coupled with at least part of a housing and including a first identification terminal, and a second cover (e.g., the second cover 300, the second cover 920 and 930, the second cover 1120, the second cover 1220, the second cover 1320 and 1330, the second cover 1420 and 1430) coupled with at least part of the first cover and including a second identification terminal which is electrically connectable with the first identification terminal, may include obtaining at least one of first information related to the first cover or second information related to the second cover; identifying at least one of a type of the first cover or a type of the second cover based on at least one of the first information or the second information; and performing a designated operation based on at least one of the type of the first cover or the type of the second cover.

According to various embodiments, obtaining the first information may further include performing authentication on the first cover.

According to various embodiments, obtaining the second information may include detecting coupling of the second cover at the first cover, obtaining identification information of the second cover through the first identification terminal at the first cover, and transmitting the obtained identification information as the second information to a processor; or detecting coupling of the second cover at the first cover, obtaining identification information of the second cover through the first identification terminal at the first cover, identifying a type of the second cover based on the obtained identification information at the first cover, and transmitting the identified type of the second cover as the second information to the processor.

According to various embodiments, performing the designated operation may include adjusting first power transmitted to the first cover through a short-range wireless communication antenna, based on the type of the second cover.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the document, the electronic devices are not limited to those described above.

It should be appreciated that various embodiments of the present document and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the document may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The embodiments disclosed in the present disclosure are suggested for easy explanation and understanding of the disclosed technical features, and are not intended to limit the scope of the present disclosure. Therefore, the scope of the present disclosure should be interpreted as including all changes or modified forms derived based on the technical idea of the present disclosure.

The invention claimed is:

1. An electronic device comprising:
a housing;
a first cover coupled with at least part of the housing, and comprising at least one first identification terminal;
a second cover coupled with at least part of the first cover, and comprising at least one second identification terminal which is electrically connectable with the first identification terminal;
an outer shell covering a region other than a partial region of an outer surface of the housing on which the first identification terminal is disposed; and
a processor, wherein the processor is configured to:

obtain at least one of first information related to the first cover or second information related to the second cover, identify at least one of a type of the first cover or a type of the second cover based on at least one of the first information or the second information, and perform a designated operation based on at least one of the type of the first cover or the type of the second cover, wherein the outer shell includes at least one first magnetic body disposed corresponding to at least one first metal member disposed on the housing, and wherein at least a portion of the outer shell is spaced apart from the housing by an external force greater than an attraction between the first magnetic body and the first metal member.

2. The electronic device of claim 1, further comprising:
a sensor module configured to detect whether the first cover is coupled or a state of the second cover;
a short-range communication antenna positioned inside the housing or forming a part of the housing; and
a short-range wireless communication circuit electrically connected with the short-range communication antenna, and configured to support a short-range wireless communication protocol.

3. The electronic device of claim 2, wherein the processor is configured to adjust a first power transmitted to the first cover through the short-range wireless communication antenna, based on the type of the second cover.

4. The electronic device of claim 2, wherein the processor is configured to:
transmit a second power for driving an authentication module of the first cover and an authentication request signal to the first cover by activating the short-range wireless communication circuit when detecting coupling of the first cover, and
control the short-range wireless communication circuit to receive a response signal from the first cover.

5. The electronic device of claim 2, wherein the first cover comprises:
a first interface module comprising the first identification terminal, and used to couple the second cover;
a first detecting member disposed at a position corresponding to the sensor module, and used to detect coupling of the first cover;
at least one antenna configured to receive power for driving at least one of the first cover or the second cover and data for control from the electronic device through the short-range communication antenna;
a rectifying circuit connected to the at least one antenna;
at least one power module connected to the rectifying circuit; and
a first processor configured to perform an authentication procedure with the electronic device based on the data received from the at least one antenna, and to detect coupling of the second cover.

6. The electronic device of claim 5, wherein the second cover comprises:
a second interface module comprising the second identification terminal, and coupled with the first interface module; and
a second detecting member used to detect an open state or a close state of the second cover.

7. The electronic device of claim 6, wherein the second cover further comprises:
at least one electronic circuit driven by the power, and performing a designated function; and a second processor configured to control the at least one electronic circuit.

8. The electronic device of claim 6, wherein the first interface module and the second interface module further comprise:
a communication terminal for transmitting and receiving the data.

9. The electronic device of claim 6, wherein the first interface module and the second interface module further comprise:
a detection terminal for detecting coupling of the second cover.

10. The electronic device of claim 9, wherein the at least one power module comprises a first power module for supplying first power to the first processor and a second power module for supplying second power for driving the second cover, and the first processor is configured to supply the second power to the second cover by activating the second power module when detecting coupling of the second cover.

11. The electronic device of claim 1, wherein the first cover comprises at least one second magnetic body on one side, and the second cover comprises at least one second metal member at a position corresponding to the second magnetic body, and
the first cover and the second cover are coupled by attraction between the second metal member and the second magnetic body.

12. The electronic device of claim 1, wherein the first cover comprises a first groove formed in a direction substantially perpendicular to a surface, and having a first hooking jaw, and the second cover comprises a first coupling member having a first protrusion which protrudes in a direction substantially perpendicular to the surface and corresponds to the first hooking jaw, and
the first cover and the second cover are coupled such that the first coupling member is inserted into the first groove and the first protrusion is hooked by the first hooking jaw.

13. The electronic device of claim 1, wherein the first cover comprises a second groove formed in a direction substantially horizontal with a surface, and having a second hooking jaw, and the second cover comprises a second coupling member having a second protrusion which protrudes in a direction substantially horizontal with the surface and corresponds to the second hooking jaw, and
the first cover and the second cover are coupled such that the second coupling member is inserted into the second groove and the second protrusion is hooked by the second hooking jaw.

14. The electronic device of claim 1, further comprising:
an auxiliary cover member coupled to a part of the first cover in which the first identification terminal is positioned not to expose the first identification terminal to outside when the second cover is not coupled.

15. The electronic device of claim 14, wherein the second cover comprises a right-handed cover which is opened to left, and a left-handed cover which is opened to right,
the first identification terminal is positioned symmetrically on a right side and a left side of the first cover, and
the auxiliary cover member comprises:
a first auxiliary cover member coupled to the first cover not to expose the first identification terminal positioned on the right side of the first cover when the right-handed cover is coupled; and
a second auxiliary cover member coupled to the first cover not to expose the first identification terminal positioned on the left side of the first cover when the left-handed cover is coupled.

16. An operating method of an electronic device which has a first cover coupled with at least part of a housing and including a first identification terminal, a second cover coupled with at least part of the first cover and including a second identification terminal which is electrically connectable with the first identification terminal, and an outer shell covering a region other than a partial region of an outer surface of the housing on which the first identification terminal is disposed, the method comprising:
- obtaining at least one of first information related to the first cover or second information related to the second cover;
- identifying at least one of a type of the first cover or a type of the second cover based on at least one of the first information or the second information; and
- performing a designated operation based on at least one of the type of the first cover or the type of the second cover,
- wherein the outer shell includes at least one magnetic body disposed corresponding to at least one metal member disposed on the housing, and
- wherein at least a portion of the outer shell is spaced apart from the housing by an external force greater than an attraction between the magnetic body and the metal member.

17. The method of claim 16, wherein obtaining the first information further comprises performing authentication on the first cover.

18. The method of claim 16, wherein obtaining the second information comprises:
- detecting coupling of the second cover at the first cover, obtaining identification information of the second cover through the first identification terminal at the first cover, and transmitting the obtained identification information as the second information to a processor; or
- detecting coupling of the second cover at the first cover, obtaining identification information of the second cover through the first identification terminal at the first cover, identifying a type of the second cover based on the obtained identification information at the first cover, and transmitting the identified type of the second cover as the second information to the processor.

19. The method of claim 16, wherein performing the designated operation comprises adjusting first power transmitted to the first cover through a short-range wireless communication antenna, based on the type of the second cover.

20. An electronic device comprising:
- a housing;
- at least one antenna configured to receive power, and transmit and receive a signal from a first external electronic device;
- an interface module including an identification terminal for identifying a type of a second external electronic device coupled to the electronic device;
- an outer shell covering a region other than a partial region of an outer surface of the housing on which the identification terminal is disposed; and
- a processor, wherein the processor is configured to:
  - perform an authentication procedure with the first external electronic device when detecting coupling with the first external electronic device,
  - after finishing the authentication, when detecting coupling of the second external electronic device, identify the second external electronic device through the identification terminal, and transmit identification information related to the second external electronic device to the first external electronic device, and
  - receive, from the first external electronic device, data for conducting a designated operation based on a type of the second external electronic device through the at least one antenna,
- wherein the outer shell includes at least one magnetic body disposed corresponding to at least one metal member disposed on the housing, and
- wherein at least a portion of the outer shell is spaced apart from the housing by an external force greater than an attraction between the magnetic body and the metal member.

* * * * *